(12) United States Patent
Yamagata et al.

(10) Patent No.: US 12,157,936 B2
(45) Date of Patent: Dec. 3, 2024

(54) GRAIN-ORIENTED ELECTRICAL STEEL SHEET, METHOD FOR MANUFACTURING GRAIN-ORIENTED ELECTRICAL STEEL SHEET, AND ANNEALING SEPARATOR UTILIZED FOR MANUFACTURE OF GRAIN-ORIENTED ELECTRICAL STEEL SHEET

(71) Applicant: NIPPON STEEL CORPORATION, Tokyo (JP)

(72) Inventors: Ryutaro Yamagata, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 707 days.

(21) Appl. No.: 17/421,327

(22) PCT Filed: Jan. 8, 2020

(86) PCT No.: PCT/JP2020/000343
§ 371 (c)(1),
(2) Date: Jul. 7, 2021

(87) PCT Pub. No.: WO2020/145318
PCT Pub. Date: Jul. 16, 2020

(65) Prior Publication Data
US 2022/0064764 A1    Mar. 3, 2022

(30) Foreign Application Priority Data
Jan. 8, 2019  (JP) .................................. 2019-001215

(51) Int. Cl.
| | |
|---|---|
| *C22C 38/06* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |

(52) U.S. Cl.
CPC ............ *C22C 38/06* (2013.01); *C21D 8/0205* (2013.01); *C21D 8/0226* (2013.01); *C21D 8/0236* (2013.01); *C21D 9/46* (2013.01); *C22C 38/001* (2013.01); *C22C 38/02* (2013.01); *C22C 38/04* (2013.01)

(58) Field of Classification Search
None
See application file for complete search history.

(56) References Cited

U.S. PATENT DOCUMENTS

| | | |
|---|---|---|
| 2009/0047537 A1 | 2/2009 | Nanba et al. |
| 2010/0055481 A1 | 3/2010 | Kubo et al. |
| 2018/0010206 A1 | 1/2018 | Kwon et al. |
| 2018/0258508 A1 | 9/2018 | Fujimura et al. |
| 2019/0390350 A1 | 12/2019 | Umada et al. |
| 2020/0017930 A1 | 1/2020 | Song et al. |

FOREIGN PATENT DOCUMENTS

| | | |
|---|---|---|
| JP | 6-88171 A | 3/1994 |
| JP | 8-269552 A | 10/1996 |
| JP | 2005-290446 A | 10/2005 |
| JP | 2008-127634 A | 6/2008 |
| JP | 2009-270129 A | 11/2009 |
| JP | 2012-214902 A | 11/2012 |
| JP | 5739840 B2 | 6/2015 |
| WO | WO 2008/062853 A1 | 5/2008 |
| WO | WO 2016/105053 A1 | 6/2016 |
| WO | WO 2018/116831 A1 | 6/2018 |
| WO | WO 2018/117639 A1 | 6/2018 |

*Primary Examiner* — Anthony M Liang
(74) *Attorney, Agent, or Firm* — Birch, Stewart, Kolasch & Birch, LLP

(57) ABSTRACT

Grain-oriented electrical steel sheet excellent in magnetic properties and excellent in adhesion of primary coating to steel sheet provided with a base metal steel sheet having a predetermined chemical composition and a primary coating formed on a surface of the base metal steel sheet and containing $Mg_2SiO_4$ as a main constituent, where a peak position of Al emission intensity obtained when performing elemental analysis by glow discharge optical emission spectrometry from a surface of the primary coating in a thickness direction of the grain-oriented electrical steel sheet is arranged within a range of 2.4 to 12.0 μm from the surface of the primary coating in the thickness direction, a number density of Al oxides at the peak position of Al emission intensity and of a size of 0.2 μm or more in terms of a circle equivalent diameter based on the area is 0.03 to 0.18/μm², and, in a plurality of Al oxides in an observed region in an observed region of 30 μm×50 μm at the peak position of Al emission intensity, a total cross-sectional area of identified Al oxides with cross-sectional areas of 0.4 to 10.0 μm² is 75.0% or more of the total cross-sectional area of all Al oxides in the observed region.

4 Claims, No Drawings

GRAIN-ORIENTED ELECTRICAL STEEL SHEET, METHOD FOR MANUFACTURING GRAIN-ORIENTED ELECTRICAL STEEL SHEET, AND ANNEALING SEPARATOR UTILIZED FOR MANUFACTURE OF GRAIN-ORIENTED ELECTRICAL STEEL SHEET

FIELD

The present invention relates to grain-oriented electrical steel sheet, a method for manufacturing grain-oriented electrical steel sheet, and an annealing separator utilized for manufacture of grain-oriented electrical steel sheet.

BACKGROUND

Grain-oriented electrical steel sheet is steel sheet containing, by mass %, Si in 0.5 to 7% or so and having crystal orientations controlled to the {110}<001>orientation (Goss orientation). For control of the crystal orientations, the phenomenon of catastrophic grain growth called secondary recrystallization is utilized.

The method for manufacturing grain-oriented electrical steel sheet is as follows: A slab is heated and hot rolled to produce hot rolled steel sheet. The hot rolled steel sheet is annealed according to need. The hot rolled steel sheet is pickled. The pickled hot rolled steel sheet is cold rolled by a cold rolling rate of 80% or more to produce cold rolled steel sheet. The cold rolled steel sheet is decarburization annealed to cause primary recrystallization. The decarburization annealed cold rolled steel sheet is finish annealed to cause secondary recrystallization. Due to the above process, grain-oriented electrical steel sheet is produced.

After the above-mentioned decarburization annealing and before the finish annealing, the surface of the cold rolled steel sheet is coated with an aqueous slurry containing an annealing separator having MgO as a main constituent and is then dried. The cold rolled steel sheet with the annealing separator dried on it is taken up into a coil, then is finish annealed. At the time of finish annealing, the MgO in the annealing separator and the $SiO_2$ in the internal oxide layer formed on the surface of the cold rolled steel sheet at the time of decarburization annealing react whereby a primary coating having forsterite ($Mg_2SiO_4$) as a main constituent is formed on the surface. After forming the primary coating, the primary coating is, for example, formed with an insulating coating (also referred to as a "secondary coating") comprised of colloidal silica and a phosphate. The primary coating and insulating coating are smaller in heat expansion coefficient than the steel sheet. For this reason, the primary coating, together with the insulating coating, imparts tension to the steel sheet to reduce the core loss. The primary coating, furthermore, raises the adhesion of the insulating coating on the steel sheet. Therefore, the adhesion of the primary coating on the steel sheet is preferably higher.

On the other hand, raising the magnetic flux density and lowering the hysteresis loss are effective for lowering the core loss of grain-oriented electrical steel sheet.

To raise the magnetic flux density of grain-oriented electrical steel sheet, it is effective to control the crystal orientations of the base metal steel sheet to the Goss orientation. Art for improving integration to the Goss orientation is proposed in PTLs 1 to 3. In these patent literature, elements improving the magnetic properties which strengthen the action of the inhibitors (Sn, Sb, Bi, Te, Pb, Se, etc.) are contained in the steel sheet. Due to this, integration to the Goss orientation rises and the magnetic flux density can be raised.

However, if steel sheet contains elements improving the magnetic properties, parts of the primary coating will aggregate, so the interface between the steel sheet and the primary coating will easily become flattened. In this case, the adhesion of the primary coating with the steel sheet will fall.

Art for raising the adhesion of a primary coating with a steel sheet is described in PTLs 4, 5, and 6.

In PTL 4, the slab is made to contain Ce in 0.001 to 0.1% and the surface of the steel sheet is formed with a primary coating containing Ce in 0.01 to 1000 mg/m². In PTL 5, in grain-oriented electrical steel sheet containing Si: 1.8 to 7% and having a primary coating having forsterite as a main constituent, the primary coating is made to contain Ce in a basis weight per side of 0.001 to 1000 mg/m².

In PTL 6, a primary coating is made to be formed characterized by the primary coating containing one or more types of alkali earth metal compounds selected from Ca, Sr, and Ba and rare earth elements by making the annealing separator having MgO as a main constituent contain compounds including a rare earth metal element compound in 0.1 to 10%, one or more types of alkali earth metal compounds selected from Ca, Sr, and Ba in 0.1 to 10%, and a sulfur compound in 0.01 to 5%.

In PTL 7, a primary coating is made to be formed characterized by containing compounds including one or more elements selected from Ca, Sr, and Ba, rare earth metal element compounds in 0.1 to 1.0%, and sulfur.

CITATIONS LIST

Patent Literature

[PTL 1] Japanese Unexamined Patent Publication No. 6-88171
[PTL 2] Japanese Unexamined Patent Publication No. 8-269552
[PTL 3] Japanese Unexamined Patent Publication No. 2005-290446
[PTL 4] Japanese Unexamined Patent Publication No. 2008-127634
[PTL 5] Japanese Unexamined Patent Publication No. 2012-214902
[PTL 6] WO No. 2008/062853
[PTL 7] Japanese Unexamined Patent Publication No. 2009-270129

SUMMARY

Technical Problem

However, if making the annealing separator contain the Y, La, Ce, or other rare earth element compounds to form a primary coating containing Y, La, and Ce, the magnetic properties sometimes fall. Further, if the number densities of particles of the Y, La, Ce, or other rare earth element compounds or the Ca, Sr, Ba, or other additives in the raw material powder when preparing the annealing separator are insufficient, sometimes regions where the primary coating has insufficiently developed will arise and sometimes the adhesion will fall. Further, sometimes rust resistance is sought in grain-oriented electrical steel sheet, but the above PTLs 1 to 4 do not have any descriptions relating to rust resistance.

An object of the present invention is to provide grain-oriented electrical steel sheet excellent in magnetic properties, excellent in adhesion of the primary coating to the base metal steel sheet, and excellent in rust resistance, a method for manufacturing grain-oriented electrical steel sheet, and an annealing separator utilized for manufacture of grain-oriented electrical steel sheet.

Solution to Problem

The grain-oriented electrical steel sheet according to the present invention is provided with a base metal steel sheet having a chemical composition containing, by mass %. C: 0.005% or less. Si: 2.5 to 4.5%. Mn: 0.02 to 0.2%, one or more elements selected from the group comprised of S and Se: total of 0.005% or less, sol. Al: 0.01% or less, and N: 0.01% or less and having a balance comprised of Fe and impurities and a primary coating formed on a surface of the base metal steel sheet and containing $Mg_2SiO_4$ as a main constituent, where a peak position of Al emission intensity obtained when performing elemental analysis by glow discharge optical emission spectrometry from a surface of the primary coating in a thickness direction of the grain-oriented electrical steel sheet is arranged within a range of 2.4 to 12.0 μm from the surface of the primary coating in the thickness direction, a number density of Al oxides at the peak position of Al emission intensity and of a size of 0.2 μm or more in terms of a circle equivalent diameter based on the area is 0.03 to 0.18/μm², and, in a plurality of Al oxides in an observed region of 30 μm×50 μm at the peak position of Al emission intensity, a total cross-sectional area of identified Al oxides with cross-sectional areas of 0.4 to 10.0 μm² is 75.0% or more of the total cross-sectional area of all Al oxides in the observed region.

The method for manufacturing grain-oriented electrical steel sheet according to the present invention comprises a process for cold rolling hot rolled steel sheet containing by mass %. C:

0).1% or less. Si: 2.5 to 4.5%. Mn: 0.02 to 0).2%, one or more elements selected from the group comprised of S and Se: total of 0.005 to 0.07%, sol. Al: 0.005 to 0.05%, and N: 0.001 to 0.030% and having a balance comprised of Fe and impurities by a cold rolling rate of 80% or more to manufacture cold rolled steel sheet, a process for decarburization annealing the cold rolled steel sheet, a process for coating the surface of the cold rolled steel sheet after decarburization annealing with an aqueous slurry containing an annealing separator and drying the aqueous slurry on the surface of the cold rolled steel sheet in a 400 to 1000° C. furnace, and a process for performing finish annealing on the cold rolled steel sheet after the aqueous slurry has been dried. The annealing separator contains MgO, at least one or more types of compounds selected from a group comprised of Y, La, and Ce, at least one or more types of compounds of metal selected from a group comprised of Ti, Zr, and Hf. and at least one or more types of compounds of metal selected from a group comprised of Ca, Sr, and Ba, when a content of the MgO in the annealing separator is defined as 100% by mass %, a total content of the compounds selected from a group comprised of Y, La, and Ce converted to oxides is 0.8 to 8.0%, a total content of the compounds of metal selected from a group comprised of Ti, Zr, and Hf converted to oxides is 0.5 to 9.0%, and a total content of the compounds of metal selected from a group comprised of Ca, Sr, and Ba converted to sulfates is 0.5 to 8.0%, a mean particle size of the compounds of metal selected from a group comprised of Ca, Sr, and Ba is 12 μm or less, a ratio of the mean particle size of the compounds of metal selected from a group comprised of Ca, Sr, and Ba to the mean particle size of the compounds of metal selected from a group comprised of Y, La, and Ce is 0.1 to 3.0, a total of the total content of the compounds of metal selected from a group comprised of Y, La, and Ce converted to oxides and the total content of the compounds of metal selected from a group comprised of Ti, Zr, and Hf converted to oxides is 2.0 to 12.5%, a ratio of a sum of the numbers of Y, La, and Ce atoms to a sum of the numbers of Ti, Zr, and Hf atoms contained in the annealing separator is 0.18 to 4.0, still further a number density of particles of the compounds of metal selected from the group comprised of Y, La, and Ce which are particles of a spherical equivalent diameter based on volume of 0.1 μm or more is 2.000.000.000/g or more, still further a number density of particles of the compounds of metal selected from the group comprised of Ti, Zr, and Hf which are particles of a spherical equivalent diameter based on volume of 0.1 μm or more is 2.000.000.000/g or more, and still further a number density of particles of the compounds of metal selected from the group comprised of Ca, Sr, and Ba which are particles of a spherical equivalent diameter based on volume of 0.1 μm or more is 2.000.000.000/g or more.

An annealing separator used for manufacture of the grain-oriented electrical steel sheet according to the present invention contains MgO, at least one or more types of compounds of metal selected from a group comprised of Y, La, and Ce, at least one or more types of compounds of metal selected from a group comprised of Ti, Zr, and Hf. and at least one or more types of compounds of metal selected from a group comprised of Ca, Sr, and Ba, when a content of the MgO in the annealing separator is defined as 100% by mass %, a total content of the compounds selected from a group comprised of Y, La, and Ce converted to oxides is 0.8 to 8.0%, a total content of the compounds of metal selected from a group comprised of Ti, Zr, and Hf converted to oxides is 0.5 to 9.0%, and a total content of the compounds of metal selected from a group comprised of Ca, Sr, and Ba converted to sulfates is 0.5 to 8.0%, a mean particle size of the compounds of metal selected from a group comprised of Ca, Sr, and Ba is 12 μm or less, a ratio of the mean particle size of the compounds of metal selected from a group comprised of Ca, Sr, and Ba to the mean particle size of the compounds of metal selected from a group comprised of Y, La, and Ce is 0.1 to 3.0, a total of the total content of the compounds of metal selected from a group comprised of Y, La, and Ce converted to oxides and the total content of the compounds of metal selected from a group comprised of Ti, Zr, and Hf converted to oxides is 2.0 to 12.5%, a ratio of a sum of the numbers of Y, La, and Ce atoms to a sum of the numbers of Ti, Zr, and Hf atoms contained in the annealing separator is 0.18 to 4.0, still further a number density of particles of the compounds of metal selected from the group comprised of Y, La, and Ce which are particles of a spherical equivalent diameter based on volume of 0.1 μm or more is 2,000,000,000/g or more, still further a number density of particles of the compounds of metal selected from the group comprised of Ti, Zr, and Hf which are particles of a spherical equivalent diameter based on volume of 0.1 μm or more is 2,000,000,000/g or more, and still further a number density of particles of the compounds of metal selected from the group comprised of Ca, Sr, and Ba which are particles of a spherical equivalent diameter based on volume of 0.1 μm or more is 2,000,000,000/g or more.

Advantageous Effects of Invention

The grain-oriented electrical steel sheet according to the present invention is excellent in magnetic properties and excellent in adhesion of a primary coating to a base metal steel sheet. The method of manufacture according to the present invention can manufacture the above-mentioned grain-oriented electrical steel sheet. The annealing separator according to the present invention is applied to the above method of manufacture. Due to this, grain-oriented electrical steel sheet can be manufactured.

DESCRIPTION OF EMBODIMENTS

The inventors investigated and studied the magnetic properties of grain-oriented electrical steel sheet containing elements for improving the magnetic properties and the adhesion of primary coatings formed by including a Y compound, La compound, and Ce compound in the annealing separator. As a result, the inventors obtained the following findings.

There are anchoring structures at the interface of the primary coating and steel sheet of the grain-oriented electrical steel sheet. Specifically, near the interface of the primary coating and steel sheet, the roots of the primary coating spread down to the inside of the steel sheet. The more the roots of the primary coating penetrate to the inside of the steel sheet, the higher the adhesion of the primary coating to the steel sheet. Furthermore, the more dispersed the roots of the primary coating inside the steel sheet (the more they are spread), the higher the adhesion of the primary coating to the steel sheet.

On the other hand, if the roots of the primary coating penetrate to the inside of the steel sheet too much, the roots of the primary coating will obstruct the secondary recrystallization in the Goss orientation. Therefore, crystal grains with random orientations will increase at the surface layer. Furthermore, the roots of the primary coating become factors inhibiting domain wall movement and the magnetic properties deteriorate. Similarly, if the roots of the primary coating are excessively dispersed inside of the steel sheet, the roots of the primary coating will obstruct the secondary recrystallization in the Goss orientation and crystal grains with random orientations will increase at the surface layer. Furthermore, the roots of the primary coating become factors inhibiting domain wall movement and the magnetic properties deteriorate.

Based on the above findings, the inventors further investigated the state of the roots of the primary coating, the magnetic properties of the grain-oriented electrical steel sheet, and the adhesion of the primary coating.

If the annealing separator is made to contain Y, La, and Ce compound to form the primary coating, as explained above, the magnetic properties fall. This is believed to be because the roots of the primary coating penetrate into the steel sheet too deeply and obstruct domain wall movement.

Therefore, the inventors experimented with lowering the contents of the Y, La, and Ce compounds in the annealing separator having MgO as the main constituent and instead including Ti, Zr, and Hf compounds to form the primary coating and experimented with making the number density of the particles of the compounds in the annealing separator before prepared into the aqueous slurry (raw material powder) a higher density. As a result, they discovered that sometimes the magnetic properties of the grain-oriented electrical steel sheet are improved and the adhesion of the primary coating is also raised.

The inventors further studied the Y, La, and Ce compounds and Ti, Zr, and Hf compounds in the annealing separator. As a result, they obtained the following findings: It is hard for unreacted Y, La, and Ce compounds and Ti, Zr, and Hf compounds to form the primary coating, so the primary coating does not become dense. In this case, the primary coating cannot cover the entire steel sheet surface and part of the steel sheet surface is exposed. If the amount of the steel sheet surface exposed increases, the rust resistance falls.

Therefore, the inventors further studied a mainly MgO annealing separator. As a result, the inventors discovered that by making the annealing separator include Y, La, and Ce compounds and Ti, Zr, and Hf compounds and additionally Ca, Sr, and Ba compounds to adjust the content of Y, La, and Ce compounds converted to oxides, the content of Ti, Zr, and Hf compounds converted to oxides, and the content of Ca, Sr, and Ba compounds converted to sulfates in the annealing separator, it is possible to adjust the depth and state of dispersion of the roots of the primary coating. Below, this point will be explained in detail.

The main constituent of the roots of the primary coating is an Al oxide such as spinel ($MgAl_2O_4$). The depth position from the surface of the peak of the Al emission intensity obtained by performing elemental analysis based on glow discharge optical emission spectrometry (GDS method) from the surface of the grain-oriented electrical steel sheet in the thickness direction (below; this referred to as "the Al peak position $D_{Al}$") is believed to show the position of existence of the spinel, that is, the position of the roots of the primary coating. Further, the number density of Al oxides as represented by spinel of a size of 0.2 μm or more by circle equivalent diameter based on area at the Al peak position $D_{Al}$ (below, referred to as "the Al oxide number density ND") is believed to show the state of dispersion of the roots of the primary coating.

If following conditions (1) to (3) are satisfied, the roots of the primary coating are suitable in length and suitable in state of dispersion, so excellent magnetic properties and adhesion of the primary coating are obtained. Furthermore, the primary coating becomes dense, so is excellent in rust resistance.

(1) The Al peak position $D_{Al}$ is 2.4 to 12.0 μm.

(2) The Al oxide number density ND is 0.03 to 0.18/μm².

(3) In a plurality of Al oxides in an observed region at the peak position of Al emission intensity, the ratio of a total cross-sectional area of identified Al oxides with cross-sectional areas of 0.4 to 10.0 μm² to a total cross-sectional area of all Al oxides in the observed region (below; referred to as the "identified Al oxide area ratio RAAREA") is 75% or more.

The above-mentioned suitable ranges of the Al peak position $D_{Al}$, the Al oxide number density ND, and the identified Al oxide area ratio RAARE A can be obtained by adjusting to suitable ranges the mean particle size of Y, La, and Ce compounds in the annealing separator, the content of Y, La, and Ce compounds converted to oxides, the content of Ca, Sr, and Ba compounds converted to sulfates, the mean particle size of Ca, Sr, and Ba compounds, and the content of Ti, Zr, and Hf compounds converted to oxides, and, in the raw material powder before preparing the annealing separator into the aqueous slurry, the number density of particles of compounds of metal selected from a group of Y, La, and Ce, the number density of particles of compounds of metal selected from a group of Ti, Zr, and Hf, and the number density of particles of compounds of metal selected from a group of Ca, Sr, and Ba.

The inventors investigated the ratio of the content CRE of the Y, La, and Ce compounds converted to oxides (explained later) and the content $C_{G\_4}$ of the Ti, Zr, and Hf compounds converted to oxides (explained later) in a mainly MgO annealing separator, images showing the distribution of Al obtained by EDS analysis in a glow discharge mark region at the Al peak position $D_{Al}$, and the Al oxide number density ND (/μm$^2$) in each image. As a result, it was learned that the Al oxide number density ND changes by adjusting the contents of Y, La, and Ce compounds and the contents of Ti, Zr, and Hf compounds in the annealing separator.

Furthermore, by adjusting the content of Y, La, and Ce compounds converted to oxides and the content of Ti, Zr, and Hf compounds converted to oxides in the annealing separator, the sizes of the Al oxides dispersed in the observed region also change.

Furthermore, at the Al peak position $D_{Al}$, Al oxides with cross-sectional areas of less than 0.4 μm$^2$ (below; referred to as "fine Al oxides") are either extremely fine roots of the coating or roots of the coating not reaching the peak depth. The fine Al oxides hardly contribute to improvement of the adhesion of the primary coating at all. Even with such fine Al oxides, if raising the number density, the coating adhesion is improved. However, if the number density of fine Al oxides increases, the primary coating will not become denser. In this case, not only will the rust resistance of the grain-oriented electrical steel sheet deteriorate, but also movement of domain walls will be inhibited and the core loss will fall. On the other hand, Al oxides with cross-sectional areas of over 10.0 μm$^2$ (below; referred to as "coarse Al oxides") aggregate and the adhesion is not effectively raised. Even with such coarse Al oxides, if raising the number density, the coating adhesion is improved. However, the higher the number density of coarse Al oxides, the more the magnetic flux density falls.

In the observed region, if the Al oxides are dispersed by 0.03 to 0.18/μm$^2$ and the total of the areas of Al oxides with an area of 0.4 to 10.0 μm$^2$, which is the size able to contribute to improvement of adhesion (below, referred to as "identified Al oxides") is 75% or more of the total area of all of the Al oxides, it means that the depth positions where the identified Al oxides are present are aligned. This means that in the primary coating, the sizes of the Al oxides are uniform (that is, there are many of the identified Al oxides) and the primary coating is dense. For this reason, the rust resistance of the grain-oriented electrical steel sheet is improved and excellent magnetic properties and excellent coating adhesion are also obtained.

The above primary coating can be formed by using the following annealing separator. An annealing separator suitable for the grain-oriented electrical steel sheet of the present invention contains MgO, Y, La, and Ce compounds, Ti, Zr, and Hf compounds, and Ca, Sr, and Ba compounds. When a content of the MgO in the annealing separator is defined as 100% by mass %, a total content of Y, La, and Ce compounds converted to oxides is 0.8 to 8.0%, a total content of the Ti, Zr, and Hf compounds converted to oxides is 0.5 to 9.0%, and a total content of the Ca, Sr, and Ba compounds converted to oxides is 0.5 to 8.0%. In the annealing separator, a mean particle size of the Ca, Sr, and Ba compounds is 12 μm or less, a ratio of the mean particle size of the Ca, Sr, and Ba compounds to the mean particle size of the Y, La, and Ce compounds is 0.1 to 3.0, a total of the total content of the Y, La, and Ce compounds converted to oxides and the total content of the Ti, Zr, and Hf compounds converted to oxides is 2.0 to 12.5%, a ratio of a sum of the numbers of Y, La, and Ce atoms to a sum of the numbers of Ti, Zr, and Hf atoms contained in the annealing separator is 0.18 to 4.0, and, in the raw material powder before preparing the annealing separator into an aqueous slurry, a number density of particles of the compounds of metal selected from the group comprised of Y, La, and Ce and having particle sizes of 0.1 μm or more, a number density of particles of the compounds of metal selected from the group comprised of Ti, Zr, and Hf and having particle sizes of 0.1 μm or more, and a number density of particles of the compounds of metal selected from the group comprised of Ca, Sr, and Ba and having particle sizes of 0.1 μm or more are 2.000.000.000/g or more. If using this annealing separator, even in grain-oriented electrical steel sheet manufactured from hot rolled steel sheet containing elements improving the magnetic flux (Sn. Sb. Bi. Te. Pb, etc.), in the primary coating, the Al peak position $D_{Al}$ becomes 2.4 to 12.0 μm, the number density ND of Al oxides of a size of 0.2 μm or more by circle equivalent diameter based on the area becomes 0.03 to 0.18/μm$^2$, and, in an observed region of 30 μm×50 μm at the peak position of the Al emission intensity, the identified Al oxide area ratio RAAREA becomes 75.0% or more. As a result, excellent magnetic properties and adhesion of the primary coating and excellent rust resistance are obtained.

The grain-oriented electrical steel sheet according to the present invention completed based on the above findings is provided with a base metal steel sheet having a chemical composition containing, by mass %. C: 0.005% or less. Si: 2.5 to 4.5%, Mn: 0.02 to 0.2%, one or more elements selected from the group comprised of S and Se: total of 0.005% or less, sol. Al: 0.01% or less, and N: 0.01% or less and having a balance comprised of Fe and impurities and a primary coating formed on a surface of the base metal steel sheet and containing $Mg_2SiO_4$ as a main constituent. A peak position of Al emission intensity obtained when performing elemental analysis by glow discharge optical emission spectrometry from a surface of the primary coating in a thickness direction of the grain-oriented electrical steel sheet is arranged within a range of 2.4 to 12.0 μm from the surface of the primary coating in the thickness direction, a number density of Al oxides at a peak position of Al emission intensity is 0.03 to 0.18/μm$^2$, and, in a plurality of Al oxides in an observed region of 30 μm×50 μm at the peak position of Al emission intensity, the total cross-sectional area of identified Al oxides with cross-sectional areas of 0.4 to 10.0 μm$^2$ is 75.0% or more of the total cross-sectional area of all Al oxides in the observed region.

The method for manufacturing grain-oriented electrical steel sheet according to the present invention comprises a process for cold rolling hot rolled steel sheet containing by mass %. C: 0.1% or less, Si: 2.5 to 4.5%. Mn: 0.02 to 0).2%, one or more elements selected from the group comprised of S and Se: total of 0.005 to 0.07%, sol. Al: 0.005 to 0.05%, and N: 0.001 to 0.030% and having a balance comprised of Fe and impurities by a cold rolling rate of 80% or more to manufacture cold rolled steel sheet used as a base metal steel sheet, a process for decarburization annealing the cold rolled steel sheet, a process for coating the surface of the cold rolled steel sheet after decarburization annealing with an aqueous slurry containing an annealing separator and drying the aqueous slurry on the surface of the cold rolled steel sheet in a 400 to 1000° C. furnace, and a process for performing finish annealing on the cold rolled steel sheet after the aqueous slurry has been dried. The annealing separator contains MgO, at least one or more types of compounds of metal selected from a group comprised of Y, La, and Ce, at least one or more types of compounds of metal selected from a group comprised of Ti, Zr, and Hf, and at least one or more types of compounds of metal selected from a group comprised of Ca, Sr, and Ba, when a content of the MgO in the annealing separator is defined as 100% by mass %, a total content of the compounds selected from a group comprised of Y, La, and Ce converted to oxides is 0.8 to 8.0%, a total content of the compounds of metal selected from a group comprised of Ti, Zr, and Hf converted to oxides is 0.5 to 9.0%, and a total content of the compounds of metal selected from a group comprised of Ca, Sr, and Ba converted to oxides is 0.5 to 8.0%, a mean particle size of the compounds of metal selected from a group comprised of Ca, Sr, and Ba is 12 µm or less, a ratio of the mean particle size of the compounds of metal selected from a group comprised of Ca, Sr, and Ba to the mean particle size of the compounds of metal selected from a group comprised of Y, La, and Ce is 0.1 to 3.0, a total of the total content of the compounds of metal selected from a group comprised of Y, La, and Ce converted to oxides and the total content of the compounds of metal selected from a group comprised of Ti, Zr, and Hf converted to oxides is 2.0 to 12.5%, a ratio of a sum of the numbers of Y, La, and Ce atoms to a sum of the numbers of Ti, Zr, and Hf atoms contained in the annealing separator is 0.18 to 4.0, and still further a number density of particles of the compounds of metal selected from the group comprised of Y, La, and Ce and having particle sizes of 0.1 µm or more, a number density of particles of the compounds of metal selected from the group comprised of Ti, Zr, and Hf and having particle sizes of 0.1 µm or more, and a number density of particles of the compounds of metal selected from the group comprised of Ca, Sr, and Ba and having particle sizes of 0.1 µm or more in the raw material powder before preparing the annealing separator into an aqueous slurry are respectively 2,000,000,000/g or more. However, the particles sizes are spherical equivalent diameters based on volume.

In the above method for manufacturing grain-oriented electrical steel sheet, the chemical composition of the hot rolled steel sheet may further contain, in place of part of the Fe, one or more elements selected from a group comprised of Cu, Sb, and Sn in a total of 0.6% or less.

In the above method for manufacturing grain-oriented electrical steel sheet, the chemical composition of the hot rolled steel sheet further contains, in place of part of the Fe, one or more elements selected from a group comprised of Bi, Te, and Pb in a total of 0.03% or less.

The annealing separator according to the present invention is used for manufacture of grain-oriented electrical steel sheet. The annealing separator contains MgO, at least one or more types of compounds of metal selected from a group comprised of Y, La, and Ce, at least one or more types of compounds of metal selected from a group comprised of Ti, Zr, and Hf, and at least one or more types of compounds of metal selected from a group comprised of Ca, Sr, and Ba, when a content of the MgO in the annealing separator is defined as 100% by mass %, a total content of the compounds selected from a group comprised of Y, La, and Ce converted to oxides is 0.8 to 8.0%, a total content of the compounds of metal selected from a group comprised of Ti, Zr, and Hf converted to oxides is 0.5 to 9.0%, and a total content of the compounds of metal selected from a group comprised of Ca. Sr, and Ba converted to sulfates is 0.5 to 8.0%, a mean particle size of the compounds of metal selected from a group comprised of Ca. Sr, and Ba is 12 µm or less, a ratio of the mean particle size of the compounds of metal selected from a group comprised of Ca. Sr, and Ba to the mean particle size of the compounds of metal selected from a group comprised of Y, La, and Ce is 0.1 to 3.0, a total of the total content of the compounds of metal selected from a group comprised of Y, La, and Ce converted to oxides and the total content of the compounds of metal selected from a group comprised of Ti, Zr, and Hf converted to oxides is 2.0 to 12.5%, a ratio of a sum of the numbers of Y, La, and Ce atoms to a sum of the numbers of Ti. Zr, and Hf atoms contained in the annealing separator is 0.18 to 4.0, and still further a number density of particles of the compounds of metal selected from the group comprised of Y, La, and Ce which and having particle sizes of 0.1 µm or more, a number density of particles of the compounds of metal selected from the group comprised of Ti, Zr, and Hf and having particle sizes of 0.1 µm or more, and a number density of particles of the compounds of metal selected from the group comprised of Ca. Sr, and Ba and having particle sizes of 0.1 µm or more in the raw material powder before preparing the annealing separator into an aqueous slurry are respectively 2,000,000,000/g or more.

Below, the grain-oriented electrical steel sheet, method for manufacturing grain-oriented electrical steel sheet, and annealing separator used for manufacture of grain-oriented electrical steel sheet according to the present invention will be explained in detail. In this Description, the "%" regarding the contents of elements will mean "mass %" unless otherwise indicated. Further, regarding the numerical values A and B, the expression "A to B" shall mean "A or more and B or less". In this expression, when only the numerical value B is assigned a unit, that unit shall also apply to the numerical value A.

Constitution of Grain-Oriented Electrical Steel Sheet

The grain-oriented electrical steel sheet according to the present invention is provided with a base metal steel sheet and a primary coating formed on the surface of the base metal steel sheet.

Chemical Composition of Base Metal Steel Sheet

The chemical composition of the base metal steel sheet forming the above-mentioned grain-oriented electrical steel sheet contains the following elements. Note that, as explained in the following method for manufacture, the base metal steel sheet is manufactured by cold rolling using hot rolled steel sheet having the later explained chemical composition.

C: 0.005% or less

Carbon (C) is an element effective for control of the microstructure up to completion of the decarburization annealing in the manufacturing process, but if the content of C is over 0.005%, the magnetic properties of the grain-oriented electrical steel sheet of the final product sheet fall. Therefore, the content of C is 0.005% or less. The content of C is preferably as low as possible. However, even if reducing the content of C to less than 0.0001%, the manufacturing costs just build up. The above effect does not change much at all. Therefore, the preferable lower limit of the content of C is 0.0001%.

Si: 2.5 to 4.5%

Silicon(S) raises the electrical resistance of steel to reduce the eddy current loss. If the content of Si is less than 2.5%, the above effect is not sufficiently obtained. On the other hand, if the content of Si is over 4.5%, the cold workability of the steel falls. Therefore, the content of Si is 2.5 to 4.5%. The preferable lower limit of the content of Si is 2.6%, more preferably 2.8%. The preferable upper limit of the content of Si is 4.0%, more preferably 3.8%.

Mn: 0.02 to 0.2%

Manganese (Mn) bonds with the later explained S and Se in the manufacturing process to form MnS and MnSe. These precipitates function as inhibitors (inhibitors of normal crystal grain growth) and in steel cause secondary recrystallization. Mn further raises the hot workability of steel. If the content of Mn is less than 0.02%, the above effect is not sufficiently obtained. On the other hand, if the content of Mn is over 0.2%, secondary recrystallization does not occur and the magnetic properties of the steel fall. Therefore, the content of Mn is 0.02 to 0.2%. The preferable lower limit of the content of Mn is 0.03%, more preferably 0.04%. The preferable upper limit of the content of Mn is 0.13%, more preferably 0.10%.

One or more elements selected from the group comprised of S and Se: total of 0.005% or less Sulfur(S) and selenium (Se) bond with Mn in the manufacturing process to form MnS and MnSe functioning as inhibitors. However, if the contents of these elements are over a total of 0.005%, due to the remaining inhibitors, the magnetic properties fall. Furthermore, due to segregation of S and Se, in grain-oriented electrical steel sheet, sometimes surface defects are caused. Therefore, in grain-oriented electrical steel sheet, the total content of the one or more elements selected from the group comprised of S and Se is 0.005% or less. The total of the contents of S and Se in the grain-oriented electrical steel sheet is preferably as low as possible. However, even if reducing the total of the content of S and the content of Se in the grain-oriented electrical steel sheet to less than 0.0005%, the manufacturing costs just build up. The above effect does not change much at all. Therefore, the preferable lower limit of the total content of the one or more elements selected from the group comprised of S and Se in grain-oriented electrical steel sheet is 0.0005%.

Sol. Al: 0.01% or less

Aluminum (Al) bonds with N in the manufacturing process to form AlN functioning as an inhibitor. However, if the content of sol. Al in the grain-oriented electrical steel sheet is over 0.01%, the inhibitor excessively remains in the steel sheet, so the magnetic properties fall. Therefore the content of sol. Al is 0.01% or less. The preferable upper limit of the content of sol. Al is 0.004%, more preferably 0.003%. The content of sol. Al is preferably as low as possible. However, even if reducing the content of sol. Al in the grain-oriented electrical steel sheet to less than 0.0001%, the manufacturing costs just build up. The above effect does not change much at all. Therefore, the preferable lower limit of the content of sol. Al in the grain-oriented electrical steel sheet is 0.0001%. Note that, in this Description, sol. Al means "acid soluble Al". Therefore the content of sol. Al is the content of acid soluble Al.

N: 0.01% or less

Nitrogen (N) bonds with Al in the manufacturing process to form AlN functioning as an inhibitor. However, if the content of N in the grain-oriented electrical steel sheet is over 0.01%, the inhibitor excessively remains in the grain-oriented electrical steel sheet and the magnetic properties fall. Therefore, the content of N is 0.01% or less. The preferable upper limit of the content of N is 0.004%, more preferably 0.003%. The content of N is preferably as low as possible. However, even if reducing the total of the content of N in the grain-oriented electrical steel sheet to less than 0.0001%, the manufacturing costs just build up. The above effect does not change much at all. Therefore, the preferable lower limit of the content of N in the grain-oriented electrical steel sheet is 0.0001%.

The balance of the chemical composition of the base metal steel sheet of the grain-oriented electrical steel sheet according to the present invention is comprised of Fe and impurities. Here, "impurities" mean the following elements which enter from the ore used as the raw material, the scrap, or the manufacturing environment etc. when industrially manufacturing the base metal steel sheet or remain in the steel without being completely removed in the purification annealing and which are allowed to be contained in a content not having a detrimental effect on the action of the grain-oriented electrical steel sheet according to the present invention.

Regarding Impurities

In the impurities in the base metal steel sheet of the grain-oriented electrical steel sheet according to the present invention, the total content of the one or more elements selected from the group comprised of Cu, Sn, and Sb, Bi, Te, and Pb is 0.30% or less.

Regarding copper (Cu), tin (Sn), antimony (Sb), bismuth (Bi), tellurium (Te), and lead (Pb), part of the Cu, Sn, Sb, Bi, Te, and Pb in the base metal steel sheet is discharged outside of the system by high temperature heat treatment also known as "purification annealing" of one process of the finish annealing. These elements raise the selectivity of orientation of the secondary recrystallization in the finish annealing to exhibit the action of improvement of the magnetic flux density, but if remaining in the grain-oriented electrical steel sheet after completion of the finish annealing, cause the deterioration of the core loss as simple impurities. Therefore, the total content of the one or more elements selected from the group comprised of Cu, Sn, and Sb, Bi, Te, and Pb is 0.30% or less. As explained above these elements are impurities, so the total content of these elements is preferably as low as possible.

Primary Coating

The grain-oriented electrical steel sheet according to the present invention, furthermore, as explained above, is provided with a primary coating. The primary coating is formed on the surface of the base metal steel sheet. The main constituent of the primary coating is forsterite ($Mg_2 SiO_4$). More specifically, the primary coating contains 50 to 90 mass % of $Mg_2 SiO_4$.

Note that, the main constituent of the primary coating is, as explained above, $Mg_2 SiO_4$, but the primary coating also contains Ce, Zr, and Ca. The content of Ce in the primary coating is 0.001 to 8.0%. The content of Zr in the primary coating is 0.0005 to 4.0%. The content of Ca in the primary coating 0.0005 to 4.0 by mass %.

As explained above, in the present invention, in the method for manufacturing grain-oriented electrical steel sheet, an annealing separator containing the above Y, La, and Ce compounds, Ti, Zr, and Hf compounds, and Ca, Sr, and Ba compounds is used. Due to this, the magnetic properties of the grain-oriented electrical steel sheet can be raised and the coating adhesion of the primary coating and rust resistance can also be raised. By Y, La, and Ce compounds, Ti, Zr, and Hf compounds, and Ca, Sr, and Ba compounds being contained in the annealing separator, the primary coating also contains the above-mentioned contents of Y, La, Ce, Ti, Zr, Hf, Ca, Sr, and Ba.

The content of $Mg_2 SiO_4$ in the primary coating can be measured by the following method. The grain-oriented electrical steel sheet is electrolyzed to separate the primary coating alone from the surface of the base metal sheet. The Mg in the separated primary coating is quantitatively analyzed by induction coupled plasma mass spectrometry (ICP-MS). The product of the obtained quantized value (mass %) and the molecular weight of $Mg_2 SiO_4$ is divided by the atomic weight of Mg to find the content of $Mg_2 SiO_4$ equivalent.

The contents of Y, La, Ce, Ti, Zr, Hf, Ca, Sr, and Ba in the primary coating can be measured by the following method. The grain-oriented electrical steel sheet is electrolyzed to separate the primary coating alone from the surface of the base metal sheet. The contents of Y, La, and Ce (mass %), the contents of Ti, Zr, and Hf (mass %), and the contents of Ca, Sr, and Ba (mass %) in the primary coating separated are quantitatively analyzed by ICP-MS.

Peak Position of Al Emission Intensity by GDS

In the grain-oriented electrical steel sheet according to the present invention, furthermore, a peak position of Al emission intensity obtained when performing elemental analysis by glow discharge optical emission spectrometry from a surface of the primary coating in a thickness direction of the grain-oriented electrical steel sheet is arranged within a range of 2.4 to 12.0 μm from the surface of the primary coating in the thickness direction.

In grain-oriented electrical steel sheet, there are interlocking structures at the interface of the primary coating and the steel sheet (base metal). Specifically, parts of the primary coating penetrate to the inside of the steel sheet from the surface of the steel sheet. The parts of the primary coating which penetrate to the inside of the steel sheet from the surface of the steel sheet exhibit a so-called anchoring effect and raise the adhesion of the primary coating with respect to the steel sheet. After this, in this Description, the parts of the primary coating penetrating to the inside of the steel sheet from the surface of the steel sheet will be defined as "roots of the primary coating".

In the regions where the roots of the primary coating deeply penetrate to the inside of the steel sheet, the main constituent of the roots of the primary coating is spinel $(MgAl_2O_4)$-one type of Al oxide. The peak of the Al emission intensity obtained when performing elemental analysis by glow discharge optical emission spectrometry shows the position where the spinel is present.

The depth position of the peak of Al emission intensity from the surface of the primary coating is defined as the "Al peak position $D_{Al}$" (μm). An Al peak position $D_{Al}$ of less than 2.4 μm means that spinel is formed at a shallow position from the surface of the steel sheet, that is, the roots of the primary coating are shallow (low). That is, this means that the roots of the primary coating are shallow. In this case, the adhesion of the primary coating is low. On the other hand, an Al peak position $D_{Al}$ of over 12.0 μm means that the roots of the primary coating have excessively developed. The roots of the primary coating penetrate down to deep parts inside of the steel sheet. In this case, the roots of the primary coating obstruct domain wall movement and the magnetic properties fall.

If the Al peak position $D_{Al}$ is 2.4 to 12.0 μm, excellent magnetic properties can be maintained while the adhesion of the primary coating can be raised. The preferable lower limit of the Al peak position DAI is 3.0 μm, more preferably 4.0 μm. The preferable upper limit of the Al peak position $D_{Al}$ is 11.0 μm, more preferably 10.0 μm.

The Al peak position $D_{Al}$ can be measured by the following method. Known glow discharge optical emission spectrometry (GDS) is used for elemental analysis. Specifically, the space above the surface of the grain-oriented electrical steel sheet is made an Ar atmosphere. Voltage is applied to the grain-oriented electrical steel sheet to cause generation of glow plasma which is used to sputter the surface layer of the steel sheet while analyzing it in the thickness direction.

The Al contained in the surface layer of the steel sheet is identified based on the emission spectrum wavelength distinctive to the element generated by excitation of atoms in the glow plasma. Furthermore, the identified Al emission intensity is plotted in the depth direction. The Al peak position $D_{Al}$ is found based on the plotted Al emission intensity.

The depth position from the surface of the primary coating in the elemental analysis is calculated based on the sputter time. Specifically, in a standard sample, the relationship between the sputter time and the sputter depth (below, referred to as the "sample results") is found in advance. The sample results are used to convert the sputter time to the sputter depth. The converted sputter depth is defined as the depth position found by the elemental analysis (Al analysis) (depth position from surface of primary coating). In the GDS in the present invention, it is possible to use a commercially available high frequency glow discharge optical emission analysis apparatus.

Number Density ND of Al Oxides of Size of 0.2 μm or More at Discharge Marks

In the grain-oriented electrical steel sheet according to the present invention, further, the number density ND of Al oxides of a size of 0.2 μm or more by circle equivalent diameter based on area at the Al peak position $D_{Al}$ is 0.03 to 0.18/μm².

As explained above, the Al peak position DAI corresponds to the part of the roots of the primary coating. At the roots of the primary coating, there is a large amount of the Al oxide spinel $(MgAl_2O_4)$ present. Therefore, if defining the number density of Al oxides at any region at the Al peak position $D_{Al}$ (for example, the bottom parts of discharge marks of the glow discharge) as the Al oxide number density ND, the Al oxide number density ND becomes an indicator showing the dispersed state of roots of the primary coating (spinel) at the surface layer of the steel sheet.

If the Al oxide number density ND is less than 0.03/μm², the roots of the primary coating are not sufficiently formed. For this reason, the adhesion of the primary coating with respect to the steel sheet is low. On the other hand, if the Al oxide number density ND is over 0.18/μm², the roots of the primary coating excessively develop and the roots of the primary coating penetrate down to deep parts inside the steel sheet. In this case, the roots of the primary coating obstruct secondary recrystallization and domain wall movement and the magnetic properties fall. Therefore, the Al oxide number density ND is 0.03 to 0.18/μm². The preferable lower limit of the Al oxide number density ND is 0.035/μm², more preferably 0.04/μm². The preferable upper limit of the number density ND is 0.15/μm², more preferably 0.1/μm².

The Al oxide number density ND can be found by the following method: A glow discharge optical emission analysis apparatus is used for glow discharge down to the Al peak position $D_{Al}$. Any 30 μm×50 μm region (observed region) in the discharge marks at the Al peak position DAI is analyzed for elements by an energy dispersive type X-ray spectroscope (EDS) to prepare a map showing the distribution of characteristic X-ray intensity in the observed region and identify the Al oxides. Specifically, a region in which the intensity of the characteristic X-rays of oxygen (O) of 50% or more with respect to the maximum intensity of the characteristic X-rays of O in the observed region is analyzed is identified as an oxide. In the identified oxide regions, a region in which the intensity of the characteristic X-rays of Al of 30% or more with respect to the maximum intensity of the characteristic X-rays of Al is analyzed is identified as an Al oxide. The identified Al oxides are mainly spinel. In addition, there is a possibility of their being silicates containing various alkali earth metals and Al in high concentrations. Among the identified Al oxides, the number of the Al oxides of a size of 0.2 μm or more by circle equivalent diameter based on area are counted and the Al oxide number density ND (/μm²) is found by the following formulas:

Circle equivalent diameter=√(4/π. (area of regions identified as Al oxides (area per analysis point in map showing distribution of characteristic X-ray intensity× number of analysis points corresponding to regions identified as Al oxides))

Area per analysis point in map showing distribution of characteristic X-ray intensity-observed region area number of analysis points ND-Number of identified Al oxides of circle equivalent diameter of 0.2 μm or more/area of observed region If the content of Ce in the primary coating is 0.001 to 8.0%, the content of Zr in the primary coating is 0.0005 to 4.0%, and the content of Ca in the primary coating is 0.0005 to 4.0%, the Al peak position $D_{Al}$ becomes 2.4 to 12.0 μm and the number density ND of Al oxides at the Al peak position $D_{Al}$ becomes 0.03 to 0.18/μm².

Identified Al Oxide Area Ratio RAAREA

In the grain-oriented electrical steel sheet according to the present invention, furthermore, in a 30 μm×50 μm observed region at the Al peak position $D_{Al}$, among the plurality of Al oxides, the ratio of the total area of the identified Al oxides with an area of 0.4 to 10.0 μm² to the total area of all Al oxides in the observed region (the identified Al oxide area ratio RAARE A) is 75.0% or more. The area of the observed region may for example be made any 30 μm×50 μm region. It may be freely selected at the Al peak position $D_{Al}$.

As explained above, the Al peak position $D_{Al}$ corresponds to the part of the roots of the primary coating. At the roots of the primary coating, there is a large amount of the Al oxide spinel ($MgAl_2O_4$) present. Therefore, the identified Al oxide area ratio RAAREA shows the dispersed state of roots of the primary coating (Al oxides) in the same way as the Al oxide number density ND.

In the 30 μm×50 μm observed region, if among the plurality of the Al oxides, the total area of Al oxides with an area of 0.4 to 10.0 μm² is 75% or more of the total area of all of the Al oxides in the observed region, it means that the depth positions of the identified Al oxides able to contribute to improvement of adhesion are aligned. This means that the grain sizes of the Al oxides in the primary coating obtained are substantially uniform and the primary coating is dense.

If the identified Al oxide area ratio RAAREA is too low, the primary coating does not become dense and the rust resistance falls. Therefore, the identified Al oxide area ratio RAAREA is 75.0% or more. The preferable identified Al oxide area ratio RAAREA is 84.0% or more, more preferably 90.0% or more.

Note that, in the above observed region, if the area of the Al oxides is less than 0.4 μm², they do not grow sufficiently as roots of the primary coating. On the other hand, if the area of the Al oxides is over 10.0 μm², the roots of the primary coating excessively develop in number. As a result, the primary coating is not dense and the rust resistance falls.

The identified Al oxide area ratio RAAREA can be found by the following method: A glow discharge optical emission analysis apparatus is used for glow discharge down to the Al peak position $D_{Al}$. Any 30 μm×50 μm region (observed region) in the discharge marks at the Al peak position $D_{Al}$ is analyzed for elements by an energy dispersive type X-ray spectroscope (EDS) to identify the Al oxides in the observed region. Specifically, a region in which the intensity of the characteristic X-rays of oxygen (O) of 50% or more with respect to the maximum intensity of the characteristic X-rays of O in the observed region is analyzed is identified as an oxide. In the identified oxide regions, a region in which the intensity of the characteristic X-rays of Al of 30% or more with respect to the maximum intensity of the characteristic X-rays of Al is analyzed is identified as an Al oxide. The identified Al oxides are mainly spinel. In addition, there is a possibility of their being silicates containing various alkali earth metals and Al in high concentrations. Based on the measurement results, a distribution chart of Al oxides in the observed region is prepared. The area of the observed region may for example be made 30 μm×50 μm. It may be selected at any Al peak position $D_{Al}$.

In the prepared distribution chart (observed region), the areas of the Al oxides are calculated. Based on the calculated results, in the distribution chart, Al oxides with an area of 0.4 to 10.0 μm² are deemed as "identified Al oxides". The total area of the identified Al oxides determined is found. Furthermore, the total area of all of the Al oxides in the distribution chart is found. Based on the following formula, the identified Al oxide area ratio RAAREA is found.

Identified Al oxide area ratio RAARE A=total area of identified Al oxides in observed region/total area of all Al oxides in observed region×100

Method for Manufacture

One example of the method for manufacturing grain-oriented electrical steel sheet according to the present invention will be explained.

One example of the method for manufacturing grain-oriented electrical steel sheet is provided with a cold rolling process, decarburization annealing process, and finish annealing process. Below, the processes will be explained.

Cold Rolling Process

In the cold rolling process, hot rolled steel sheet is cold rolled to manufacture cold rolled steel sheet. The hot rolled steel sheet has the following chemical composition.

C: 0.1% or Less

If the content of C in the hot rolled steel sheet is over 0.1%, the time required for the decarburization annealing becomes longer. In this case, the manufacturing costs rise and the productivity falls. Therefore, the content of C in the hot rolled steel sheet is 0.1% or less. The preferable upper limit of content of C of the hot rolled steel sheet is 0.092%, more preferably 0.085%. The lower limit of the content of C of the hot rolled steel sheet is 0.005%, more preferably 0.02%, still more preferably 0.04%.

Si: 2.5 to 4.5%

As explained in the section on the chemical composition of the grain-oriented electrical steel sheet of the finished product, Si raises the electrical resistance of steel, but if excessively included, the cold workability falls. If the content of Si of the hot rolled steel sheet is 2.5 to 4.0%, the content of Si of the grain-oriented electrical steel sheet after the finish annealing process becomes 2.5 to 4.5%. The preferable upper limit of the Si content of hot rolled steel sheet is 4.0%, more preferably 3.8%. The preferable lower limit of the content of Si of the hot rolled steel sheet is 2.6%, more preferably 2.8%.

Mn: 0.02 to 0.2%

As explained in the section on the chemical composition of the grain-oriented electrical steel sheet of the finished product, in the manufacturing process, Mn bonds with S and Se to form precipitates which function as inhibitors. Mn further raises the hot workability of steel. If the content of Mn of the hot rolled steel sheet is 0.02 to 0.2%, the content of Mn of the grain-oriented electrical steel sheet after the finish annealing process becomes 0.02 to 0.2%. The preferable upper limit of the content of Mn of the hot rolled steel sheet is 0.13%, more preferably 0.1%. The preferable lower limit of the content of Mn in the hot rolled steel sheet is 0.03%, more preferably 0.04%.

One or more elements selected from the group comprised of S and Se: total of 0.005 to 0.07%

In the manufacturing process, sulfur(S) and selenium (Se) bond with Mn to form MnS and MnSe. Both MnS and MnSe function as inhibitors required for suppressing crystal grain growth during secondary recrystallization. If the total content of the one or more elements selected from the group comprised of S and Se is less than 0.005%, the above effect is hard to obtain. On the other hand, if the total content of the one or more elements selected from the group comprised of S and Se is over 0.07%, in the manufacturing process, secondary recrystallization does not occur and the magnetic properties of the steel fall. Therefore, in the hot rolled steel sheet, the total content of the one or more elements selected from the group comprised of S and Se is 0.005 to 0.07%. The preferable lower limit of the total content of the one or more elements selected from the group comprised of S and Se is 0.008%, more preferably 0.016%. The preferable upper limit of the total content of the one or more elements selected from the group comprised of S and Se is 0.06%, more preferably 0.05%.

Sol. Al: 0.005 to 0.05%

In the manufacturing process, aluminum (Al) bonds with N to form AlN. AlN functions as an inhibitor. If the content of the sol. Al in the hot rolled steel sheet is less than 0.01%, the above effect is not obtained. On the other hand, if the content of the sol. Al in the hot rolled steel sheet is over 0.05%, the AlN coarsens. In this case, it becomes difficult for the AlN to function as an inhibitor and sometimes secondary recrystallization is not caused. Therefore, the content of the sol. Al in the hot rolled steel sheet is 0.005 to 0.05%. The preferable upper limit of the content of the sol. Al in the hot rolled steel sheet is 0.04%, more preferably 0.035%. The preferable lower limit of the content of the sol. Al in the hot rolled steel sheet is 0.01%, more preferably 0.015%.

N: 0.001 to 0.030%

In the manufacturing process, nitrogen (N) bonds with Al to form AlN functioning as an inhibitor. If the content of N in the hot rolled steel sheet is less than 0.001%, the above effect is not obtained. On the other hand, if the content of N in the hot rolled steel sheet is over 0.030%, the AlN coarsens. In this case, it becomes difficult for the AlN to function as an inhibitor, and sometimes secondary recrystallization is not caused. Therefore, the content of N in the hot rolled steel sheet is 0.001 to 0.030%. The preferable upper limit of the content of N in the hot rolled steel sheet is 0.012%, more preferably 0.010%. The preferable lower limit of the content of N in the hot rolled steel sheet is 0.005%, more preferably 0.006%.

The balance of the chemical composition in the hot rolled steel sheet of the present invention is comprised of Fe and impurities. Here, "impurities" mean elements which enter from the ore used as the raw material, the scrap, or the manufacturing environment etc. when industrially manufacturing the hot rolled steel sheet and which are allowed to be contained in a range not having a detrimental effect on the hot rolled steel sheet of the present embodiment.

Regarding Optional Elements

The hot rolled steel sheet according to the present invention may further contain, in place of part of the Fe, one or more elements selected from the group comprised of Cu, Sn and Sb in a total of 0.6% or less. These elements are all optional elements.

One or more elements selected from the group comprised of Cu, Sn, and Sb: total of 0 to 0.6%

Copper (Cu), tin (Sn), and antimony (Sb) are all optional elements and need not be contained. If included, Cu, Sn, and Sb all raise the magnetic flux density of grain-oriented electrical steel sheet. If Cu, Sn, and Sb are contained even a little, the above effect is obtained to a certain extent. However, if the contents of Cu, Sn, and Sb are over a total of 0.6%, at the time of decarburization annealing, it becomes difficult for an internal oxide layer to be formed. In this case, at the time of the finish annealing, the formation of the primary coating, which proceeds with the reaction of MgO of the annealing separator and the $SiO_2$ of the internal oxide layer, is delayed. As a result, the adhesion of the primary coating formed falls. Further, after purification annealing, Cu, Sn, and Sb easily remain as impurity elements. As a result, the magnetic properties deteriorate. Therefore, the content of one or more elements selected from the group comprised of Cu, Sn, and Sb is a total of 0) to 0.6%. The preferable lower limit of the total content of one or more elements selected from the group comprised of Cu, Sn, and Sb is 0.005%, more preferably 0.007%. The preferable upper limit of the total content of one or more elements selected from the group comprised of Sn, and Sb is 0.5%, more preferably 0.45%.

The hot rolled steel sheet according to the present invention may further contain, in place of part of the Fe, one or more elements selected from the group comprised of Bi, Te, and Pb in a total of 0.03% or less. These elements are all optional elements.

One or more elements selected from group comprised of Bi, Te, and Pb: total of 0) to 0.03% Bismuth (Bi), tellurium (Te), and lead (Pb) are all optional elements and need not be contained. If included, Bi, Te, and Pb all raise the magnetic flux density of grain-oriented electrical steel sheet. If these elements are contained even a little, the above effect is obtained to a certain extent. However, if the total content of these elements is over 0.03%, at the time of finish annealing, these elements segregate at the surface and the interface of the primary coating and steel sheet becomes flattened. In this case, the coating adhesion of the primary coating falls. Therefore, the total content of the one or more elements selected from the group comprised of Bi, Te, and Pb is 0) to 0.03%. The preferable lower limit value of the total content of the one or more elements selected from the group comprised of Bi, Te, and Pb is 0.0005%, more preferably 0.001%. The preferable upper limit of the total content of the one or more elements selected from the group comprised of Bi, Te, and Pb is 0.02%, more preferably 0.015%.

The hot rolled steel sheet having the above-mentioned chemical composition is manufactured by a known method. One example of the method of manufacturing the hot rolled steel sheet is as follows. A slab having a chemical composition the same as the above-mentioned hot rolled steel sheet is prepared. The slab is manufactured through a known refining process and casting process. The slab is heated. The heating temperature of the slab is, for example, over 1280° C. to 1350° C. The heated slab is hot rolled to manufacture the hot rolled steel sheet. 35

The prepared hot rolled steel sheet is cold rolled to produce the cold rolled steel sheet of the base metal steel sheet. The cold rolling may be performed only one time or may be performed several times. If performing cold rolling several times, after performing cold rolling, process annealing is performed for purpose of softening the steel, then cold rolling is performed. By performing cold rolling one time or several times, cold rolled steel sheet having the finished product thickness (thickness of finished product) is manufactured.

The cold rolling rate in the one time or several times of cold rolling is 80% or more. Here, the cold rolling rate (%) is defined as follows:

Cold rolling rate (%)={1−(thickness of cold rolled steel sheet after final cold rolling)/(thickness of hot rolled steel sheet before start of initial cold rolling)}×100

Note that, the preferable upper limit of the cold rolling rate is 95%. Further, before cold rolling the hot rolled steel sheet, the hot rolled steel sheet may be heat treated or may be pickled.

Decarburization Annealing Process

The steel sheet manufactured by the cold rolling process is treated by decarburization annealing and if necessary is treated by nitridation annealing. The decarburization annealing is performed in a known hydrogen-nitrogen-containing wet atmosphere. Due to the decarburization annealing, the C concentration of the grain-oriented electrical steel sheet is reduced to 50 ppm or less able to suppress magnetic aging deterioration. In the decarburization annealing, furthermore, primary recrystallization occurs at the steel sheet and the working strain introduced due to the cold rolling process is relieved. Furthermore, in the decarburization annealing process, an internal oxide layer having $SiO_2$ as its main constituent is formed at the surface layer part of the steel sheet. The annealing temperature in the decarburization annealing is known. For example, it is 750 to 950° C. The holding time at the annealing temperature is, for example, 1 to 5 minutes.

Finish Annealing Process

The steel sheet after the decarburization annealing process is treated by a finish annealing process. In the finish annealing process, first, the surface of the steel sheet is coated with an aqueous slurry containing the annealing separator. The steel sheet on which the aqueous slurry was coated is annealed (finish annealing).

Regarding Aqueous Slurry

The aqueous slurry is produced by adding industrial use pure water to the annealing separator explained later and stirring them. The ratio of the annealing separator and industrial use pure water may be determined so as to give the required coating amount at the time of coating by a roll coater. For example, it is preferably 2 times or more and 20 times or less. If the ratio of water to the annealing separator is less than 2 times, the viscosity of the aqueous slurry will become too high and the annealing separator cannot be uniformly coated on the surface of the steel sheet, so this is not preferable. If the ratio of the water to the annealing separator is over 20 times, in the succeeding drying process, the aqueous slurry will become insufficiently dried and the water content remaining in the finish annealing will cause additional oxidation of the steel sheet whereby the appearance of the primary coating will deteriorate, so this is not preferable.

Regarding Annealing Separator

In the present invention, the annealing separator used in the finish annealing process contains magnesium oxide (MgO) and additives. MgO is the main constituent of the annealing separator. The "main constituent" means the constituent contained in 50 mass % or more in a certain substance and preferably is 70 mass % or more, more preferably 90 mass % or more. The amount of deposition of the annealing separator on the steel sheet is, per side, for example preferably 2 g/m² or more and 10 g/m² or less. If the amount of deposition of the annealing separator on the steel sheet is less than 2 g/m², in the finish annealing, the steel sheets will end up sticking to each other, so this is not preferable. If the amount of deposition of the annealing separator on the steel sheet is over 10 g/m², the manufacturing costs increase, so this is not preferable. The annealing separator may be coated by electrostatic coating etc. as well instead of coating by aqueous slurry.

The additives include at least one or more types of compounds of metal selected from a group comprised of Y. La, and Ce, at least one or more types of compounds of metal selected from a group comprised of Ti, Zr, and Hf, and at least one or more types of compounds of metal selected from a group comprised of Ca, Sr, and Ba, wherein when a content of the MgO in the annealing separator is defined as 100% by mass %, a total content of the compounds of metal selected from a group comprised of Y, La, and Ce converted to oxides is 0.8 to 8.0%, a total content of the compounds of metal selected from a group comprised of Ti, Zr, and Hf converted to oxides is 0).5 to 9.0%, and a total content of the compounds of metal selected from a group comprised of Ca. Sr, and Ba converted to oxides is 0.5 to 8.0%. In the annealing separator, the mean particle size of the compounds of metal selected from a group comprised of Ca, Sr, and Ba is 12 μm or less and the ratio of the mean particle size of the compounds of metal selected from a group comprised of Ca. Sr, and Ba to the mean particle size of the compounds of metal selected from a group comprised of Y, La, and Ce is 0.1 to 3.0, and a total of the total content of the compounds of metal selected from a group comprised of Y, La, and Ce converted to oxides and the total content of the compounds of metal selected from a group comprised of Ti, Zr, and Hf converted to oxides is 2.0 to 12.5%. A ratio of a sum of the numbers of Y, La, and Ce atoms to a sum of the numbers of Ti, Zr, and Hf atoms contained in the annealing separator is 0.18 to 4.0.

Additives

The additives include Y, La, and Ce compounds, Ti, Zr, and Hf compounds, and Ca, Sr, and Ba compounds. The contents of the Y, La, and Ce compounds, the Ti, Zr, and Hf compounds, and the Ca, Sr, and Ba compounds are as follows.

Compounds of Metal Selected From Group Comprised of Y. La, and Ce

Compounds of metal selected from the group comprised of Ya, La, and Ce ("Y, La, and Ce compounds") are contained, converted to oxides, in a total of 0.8 to 8.0% when defining the MgO content in the annealing separator as 100% by mass %. Here, a certain single type of Y, Ya, and Ce compound contained in the annealing separator is defined as $M_{R\ E}$. The content $W_{R\ E}$ (mass %) of $M_{R\ E}$ converted to oxides in the annealing separator is as follows.

$W_{R\ E}$= (amount of addition of $M_{R\ E}$ (mass %))/(molecular weight of $M_{R\ E}$)×((molecular weight of $Y_2\ O_3$)×(number of Y atoms per molecule of $M_{R\ E}$/2)+ (molecular weight of $La_2\ O_3$)×(number of La atoms per molecule of $M_{R\ E}$/2)+ (molecular weight of $CeO_2$)×(number of Ce atoms per molecule of $M_{R\ E}$))

Further, regarding the $M_{R\ E}$, the ratio $x_{R\ E}$ of the sum of the numbers of Y, La, and Ce atoms to the number of Mg atoms contained in the annealing separator is as follows. $X_{R\ E}$=((number of atoms of Y per molecule of $M_{R\ E}$)+ (number of atoms of La per molecule of $M_{R\ E}$)+(number of atoms of Ce per molecule of $M_{R\ E}$))×(amount of addition of $M_{R\ E}$ (mass %)/molecular weight of $M_{R\ E}$)×(molecular weight of $Mg_{0/100}$)

Therefore, the total content $C_{R\ E}$ of the Y, La, and Ce compounds converted to oxides when defining the MgO content as 100% by mass % in an annealing separator to which one or two or more of Y, La, and Ce compounds have been added (below, referred to as "the content $C_{R\ E}$ of Y, La, and Ce compounds converted to oxides") and the ratio $X_{R\ E}$ of the sum of the numbers of Y, La, and Ce atoms with respect to the number of Mg atoms in the annealing separator (below; referred to as "the abundance ratio $X_{R\ E}$ of Y, La, and Ce atoms") are respectively the sum of $W_{R\ E}$ and sum of $X_{R\ E}$ of compounds of metal selected from the group comprised of Ya, La, and Ce contained in the annealing separator.

"Y, La, and Ce compounds" for example are oxides or hydroxides, carbonates, sulfates, etc. part or all of which are changed to oxides by later explained drying treatment and finish annealing treatment. The Y. La, and Ce compounds suppress aggregation of the primary coating. The Y, La, and Ce compounds further function as sources of oxygen release. For this reason, growth of the roots of the primary coating formed by the finish annealing is promoted and the oxides of the coating become denser. As a result, the adhesion of the primary coating with respect to the steel sheet rises. Furthermore, the rust resistance rises. If the content $C_{R\ E}$ converted to oxides is less than 0).8%, the above effect is not sufficiently obtained. On the other hand, if the content $C_{R\ E}$ converted to oxides is over 8.0%, the roots of the primary coating excessively develop. In this case, the roots of the primary coating will obstruct domain wall movement, so the magnetic properties fall. If the content $C_{R\ E}$ converted to oxides is over 8.0%, furthermore, the content of MgO in the annealing separator becomes lower, so formation of forsterite is suppressed. That is, the reactivity falls. Therefore, the content $C_{R\ E}$ converted to oxides is 0.8 to 8.0%. The preferable lower limit of the content $C_{R\ E}$ converted to oxides is 1.0%, more preferably 2.0%. The preferable upper limit of the content $C_{R\ E}$ converted to oxides is 6.0%, more preferably 4.5%.

Compounds of Metal Selected From Group Comprised of Ti, Zr, and Hf

Compounds of metal selected from the group comprised of Ti, Zr, and Hf ("Ti, Zr, and Hf compounds") are contained, converted to oxides, in a total of 0.5 to 9.0% when defining the MgO content in the annealing separator as 100% by mass %. Here, a certain single type of Ti, Zr, and Hf compound contained in the annealing separator is defined as $M_{G\ 4}$. The content $W_{G\ 4}$ (mass %) of $M_{G\ 4}$ converted to oxides in the annealing separator is as follows.

$W_{G\ 4}$=(amount of addition of $M_{G\ 4}$ (mass %))/(molecular weight of $M_{G\ 4}$)×((molecular weight of $TiO_2$)×(number of Ti atoms per molecule of $M_{G\ 4}$)+ (molecular weight of $ZrO_2$)×(number of Zr atoms per molecule of $M_{G\ 4}$)+ (molecular weight of $HfO_2$)×(number of Hf atoms per molecule of $M_{G\ 4}$))

Further, regarding the $M_{G\ 4}$, the ratio $x_{G\ 4}$ of the sum of the numbers of Ti, Zr, and Hf atoms to the number of Mg atoms contained in the annealing separator is as follows.

$X_{G\ 4}$=((number of atoms of Ti per molecule of $M_{G\ 4}$)+(number of atoms of Zr per molecule of $M_{G\ 4}$)+ (number of atoms of Hf per molecule of $M_{G\ 4}$))×(amount of addition of $M_{G\ 4}$=(mass %)/molecular weight of $M_{G\ 4}$)×(molecular weight of MgO/100)

Therefore, the total content $C_{G\ 4}$ of the Ti, Zr, and Hf compounds converted to oxides when defining the MgO content as 100% by mass % in an annealing separator to which one or two or more of Ti, Zr, and Hf compounds have been added (below, referred to as "the content $C_{G\ 4}$ of Ti, Zr, and Hf compounds converted to oxides") and the ratio $X_{G\ 4}$ of the sum of the numbers of Ti, Zr, and Hf atoms with respect to the number of Mg atoms in the annealing separator (below, referred to as "the ratio of existence $X_{G\ 4}$ of Ti, Zr, and Hf atoms") are respectively the sum of $W_{G\ 4}$ and the sum of $x_{G\ 4}$ of compounds of metal selected from the group comprised of Ti, Zr, and Hf contained in the annealing separator.

"Ti, Zr, and Hf compounds" for example are oxides and hydroxides, carbonates, sulfates, etc. part or all of which are changed to oxides by later explained drying treatment and finish annealing treatment. The Ti, Zr, and Hf compounds, when included in the annealing separator together with the Y, La, and Ce compounds, react with part of the Y, La, and Ce compounds during the finish annealing to form complex oxides. If complex oxides are formed, compared with when the Y, La, and Ce compounds are contained alone, the oxygen release ability of the annealing separator can be increased. For this reason, by Ti, Zr, and Hf compounds being included instead of Y, La, and Ce compounds, the fall in magnetic properties accompanying inclusion of excessive Y, La, and Ce compounds can be suppressed while promoting growth of the roots of the primary coating and raising the adhesion of the primary coating with respect to the steel sheet. If the content $C_{G\ 4}$ converted to oxides is less than 0.5%, the above effect cannot be sufficiently obtained. On the other hand, if the content $C_{G\ 4}$ converted to oxides is over 9.0%, the content of MgO in the annealing separator becomes lower, so formation of forsterite is suppressed. That is, the reactivity falls and the amount of surface oxides decreases. As a result, the rust resistance deteriorates. Still further, if the content $C_{G\ 4}$ converted to oxides is over 9.0%, the magnetic properties sometimes fall. If the content $C_{G\ 4}$ converted to oxides is 0.5 to 9.0%, the fall in the rust resistance and the fall in the magnetic properties can be suppressed while the adhesion of the primary coating to the base metal steel sheet can be raised.

The preferable lower limit of the content $C_{G\ 4}$ converted to oxides is 1.0%, more preferably 2.0%. The preferable upper limit of the content $C_{G4}$ is 8.0%, more preferably 7.5%.

Total Content of Content $C_{R\ E}$ of Y. La, and Ce Compounds Converted to Oxides and Content $C_{G\ 4}$ of Ti, Zr, and Hf Compounds Converted to Oxides The total content of the content $C_{R\ E}$ of Y, La, and Ce compounds converted to oxides and the content $C_{G\ 4}$ of Ti, Zr, and Hf compounds converted to oxides is 2.0 to 12.5%. If the total content is less than 2.0%, the roots of the primary coating do not sufficiently grow and the adhesion of the primary coating to the steel sheet falls. On the other hand, if the total content is over 12.5%, the roots of the primary coating excessively develop and the magnetic properties fall. Therefore, the total content of the content $C_{R\ E}$ of Y, La, and Ce compounds converted to oxides and the content $C_{G\ 4}$ of Ti, Zr, and Hf compounds converted to oxides is 2.0 to 12.5%. The preferable lower limit of the total content is 3.0%, while the preferable upper limit is 11.0%.

Compounds of Metal Selected From Group Comprised of Ca, Sr, and Ba

Compounds of metal selected from the group comprised of Ca. Sr, and Ba (referred to as "Ca, Sr, and Ba compounds") are contained, converted to sulfates, in a total of 0).5 to 8.0% when defining the MgO content in the annealing separator as 100% by mass %. Here, when defining a certain single type of Ca. Sr, and Ba compound contained in the annealing separator as $M_{AE}$, the content $W_{AE}$ of $M_{AE}$ converted to sulfates when defining the MgO content in the annealing separator as 100% by mass % is as follows.

$W_{AE}$=mass % of MA E/molecular weight of $M_{A\ E}$×((number of atoms of Ca per molecule of MA E)×(molecular weight of $CaSO_4$)+ (number of atoms of Sr per molecule of $M_{AE}$)×(molecular weight of $SrSO_4$)+ (number of atoms of Ba per molecule of $M_{AE}$)× (molecular weight of $BaSO_4$))

Therefore, the total content CAE of the Ca, Sr, and Ba compounds converted to sulfates when the content of MgO in the annealing separator in which one or two or more of Ca, Sr, and Ba compounds are added is defined as 100% by mass % (below, referred to as "the content CAE of the Ca, Sr, and Ba compounds converted to oxides") is the sum of $W_{G4}$.

The Ca, Sr, and Ba compounds are for example sulfates, hydroxides, carbonates, etc. Ca. Sr, and Ba ions are fast in diffusion in the coating, so by addition of Ca. Sr, and Ba compounds, the speed of formation of the primary coating rises, the coating becomes denser, and the rust resistance is improved. If the content CAE converted to sulfates is less than 0.5%, the above effect is not sufficiently obtained. On the other hand, if the content $C_{A\ E}$ converted to sulfates is over 8.0%, the roots of the primary coating excessively develop and sometimes the magnetic properties fall. Further, if the content $C_{AE}$ converted to sulfates is over 8.0%, the oxides in the steel sheet become too dense, fine defects form in the coating due to the escape of gas from the steel sheet in the latter stage of finish annealing, and the rust resistance deteriorates. If the content $C_{AE}$ converted to sulfates is 0.5 to 8.0%, the drop in magnetic properties can be suppressed while raising the adhesion of the primary coating to the base metal steel sheet and the rust resistance of the grain-oriented electrical steel sheet can be raised.

The mean particle size $PS_{A\ E}$ of the Ca. Sr, and Ba compounds is 12 µm or less. If mean particle size $PS_{A\ E}$ of the Ca. Sr, and Ba compounds is over 12 µm, formation of the coating will not become faster and even if the coating adhesion is improved due to the effect of joint addition of the Y, La, and Ce compounds and the Ti, Zr, and Hf compounds, the coating will not become denser and the rust resistance will be hard to improved. Therefore, the mean particle size $PS_{A\ E}$ is 12 µm or less. The preferable upper limit of the mean particle size $PS_{A\ E}$ is 8 µm, more preferably 6 µm. The lower limit of the mean particle size $PS_{A\ E}$ is not particularly prescribed, but in industrial production becomes for example 0.01 µm or more.

The mean particle size $PS_{R\ E}$ is found by measuring the Y, La, and Ce compound powder by the laser diffraction/scattering method based on JIS Z8825 (2013) using a laser diffraction/scattering type particle size distribution measuring device. Due to this, the mean particle size $PS_{RE}$ can be found. Further, similarly the mean particle size $PS_{A\ E}$ is found by measuring the Ca, Sr, and Ba compound powder by the laser diffraction/scattering method based on JIS Z8825 (2013) using a laser diffraction/scattering type particle size distribution measuring device. Due to this, the mean particle size $PS_{A\ E}$ can be found.

As explained above, Ca, Sr, and Ba ions are fast in diffusion in the primary coating, so by addition of Ca, Sr, and Ba compounds, the speed of formation of the primary coating rises. Further, by making the Ca, Sr, and Ba compounds smaller in size, the speed of formation of the primary coating further rises. By controlling the ratio of the particle sizes of the Y, La, and Ce compounds having the oxygen release function and the Ca, Sr, and Ba compounds to specific ranges, formation of the primary coating is further promoted compared with just making the Ca, Sr, and Ba compounds smaller in size, the sizes of the unit components of the primary coating, that is, the oxide particles, become uniform and finer, and a dense coating is obtained. As a result, exposure of the surface of the steel sheet is reduced and the rust resistance of the grain-oriented electrical steel sheet is improved. From this viewpoint, the ratio of the mean particle size of the Ca, Sr, and Ba compounds to the mean particle size of the Y, La, and Ce compounds (mean particle size ratio $RA_{AE/RE}$) is 0.1 to 3.0. If the mean particle size ratio $RA_{AE/RE}$ is less than 0.1, the oxygen release ability for breakdown of Ca, Sr, and Ba compounds becomes insufficient, the diffusion flux of Ca, Sr, and Ba into the coating becomes smaller, and the above effect is not obtained. Further, if the ratio of the mean particle size of the Ca, Sr, and Ba compounds to the mean particle size of the Y, La, and Ce compounds (mean particle size ratio $RA_{AE/RE}$) is over 3.0, since the diffusion sites of Ca, Sr, and Ba are limited, the diffusion flux of the Ca, Sr, and Ba into the coating becomes smaller, so the above effect cannot be obtained.

The mean particle size ratio $RA_{AE/RE}$ is found by the following method. The same measurement method as the above-mentioned mean particle size $PS_{R\ E}$ is used to find the mean particle size $PS_{A\ E}$. The obtained mean particle sizes $PS_{RE}$ and $PS_{A\ E}$ are used to find the mean particle size ratio $RA_{AE/RE}$ by the following formula.

Mean particle size ratio $RA_{AE/RE}$=mean particle size $PS_{A\ E}$/mean particle size $PS_{R\ E}$ (Y+La+Ce)/(Ti. Zr, Hf) Ratio by Number of Atoms in Annealing Separator The ratio of the sum of the numbers of Y, La, and Ce atoms to the sum of the numbers of Ti, Zr, and Hf atoms contained in the annealing separator ($X_{R\ E}/X_{G\ 4}$) is 0.18 to 4.0. If $X_{R\ E}/X_{G4}$ is less than 0.18, during the finish annealing, the Ti, Zr, and Hf which do not react with the Y, La, and Ce atoms increase too much and as a result the coating does not become dense. For this reason, the rust resistance deteriorates. On the other hand, even if $X_{R\ E}/X_{G4}$ is over 4.0, growth of the coating is not promoted and the adhesion falls. If $X_{R\ E}/X_{G4}$ is 0.18 to 4.0, the adhesion of the primary coating with respect to the steel sheet rises. The preferable lower limit of $X_{R\ E}/X_{G\ 4}$ is 0.3, more preferably 0.5. The preferable upper limit of $X_{R\ E}/X_{G\ 4}$ is 3.0, more preferably 2.0.

$N_{RE}$, $N_{G\ 4}$, and $N_{A\ E}$, in Annealing Separator

If, when preparing the annealing separator, the number densities of the particles in the raw material powder of the Y, La, Ce, and other rare earth element compounds or Ti, Zr, Hr, and other metal compounds, and Ca, Sr, Ba, and other additives are insufficient, regions of insufficient development of the primary coating will arise and sometimes the adhesion and rust resistance will fall. In the raw material powder contained in the annealing separator, the number density $N_{RE}$ of particles of a particle size of 0.1 µm or more of the compounds of metal selected from the group comprised of Y, La, and Ce, the number density $N_{G\ 4}$ of particles of a particle size of 0.1 µm or more of the compounds of metal selected from the group comprised of Ti, Zr, and Hf, and the number density $N_{A\ E}$ of particles of a particle size of 0.1 µm or more of the compounds of metal selected from the group comprised of Ca, Sr, and Ba are respectively 2,000,000,000/g or more. The particle sizes of these metal compounds are found as the spherical equivalent diameter based on volume and are found from the particle size distribution based on the number of particles obtained by measurement of the raw material powder by a laser diffraction type particle size distribution measuring device. 25 Here, the "particle size distribution based on the number of particles" shows the frequency of existence (%) with respect to the total particles of the particles in different sections after dividing into 30 or more sections by equal widths in the log scale a range of particle sizes having any value in a range of 0). 1 to 0.15 µm as a minimum size and any value in 2000 to 4000 µm as a maximum size. Here, the representative particle size D of each section is found as $$D=10^{\wedge}((LogD_{MAX}+LogD_{MIN})/2)$$

using the upper limit value $D_{MAX}$ [µm] and lower limit value $D_{MIN}$ [µm] of the respective sections.

Furthermore, the weight w [g] of the particles of each section in 100 particles of the raw material powder is found as $$w=f \cdot d \cdot (D^{\wedge}3 \cdot \pi)/6$$

using the frequency of existence "f" with respect to all particles, the representative particle size D [µm], and the specific gravity "d" [g/µm$^3$] of the metal compound.

The sum W [g] of the "w" of all sections is the average weight of 100 particles of the raw material powder, so the number of particles "n" [/g] in 1 g of the metal compound powder is found as $$n=100/W.$$

If finding the number density $N_{R\ E}$ of particles with a particle size of 0.1 µm or more of compounds of metal selected from the group comprised of Y, La, and Ce, the numbers "n" of particles in 1 g of the metal compound powders in the raw material powder are calculated and the contents "c" (%) of the respective metal compounds in the slurry and the sum C (%) of all of the contents "c" are used to find this as:

$$N_{RE}=\Sigma(n \cdot c/C).$$

The number densities $N_{G\ 4}$ and $N_{AE}$ are found in a similar way.

If $N_{RE}$ or $N_{G\ 4}$ is less than 2,000,000,000/g, during the finish annealing, the effect of growth of the roots of the primary coating becomes lopsided and regions arise where the growth of the roots is not sufficiently promoted. As a result, the adhesion of the primary coating with respect to the steel sheet is not sufficiently obtained. Not only this, the routes for diffusion of the alkali earth metal elements cannot be secured leading to deterioration of the rust resistance. If $N_{RE}$ and $N_{G\ 4}$ are 2,000,000,000/g or more, the adhesion of the primary coating rises. Y, La, and Ce and Ti, Zr, and Hf etc. have the effect of releasing oxygen during the finish annealing. Y, La, and Ce gently release oxygen from a low temperature to a high temperature. On the other hand, Ti, Zr, and Hf may conceivably be relatively short in time periods of release of oxygen, but have the effect of raising the effect of release of oxygen of Y, La, and Ce and may conceivably continue to keep down aggregation of the internal oxide layer required for development of the coating. For this reason, by raising the number densities to raise the state of dispersion in the separator layer, this interaction may conceivably be effectively obtained.

If $RA_{AE/RE}$ is within the preferable range and $N_{RE}$, $N_{G4}$, and $N_{A\ E}$ are 2,000,000,000/g or more, the coating becomes more remarkably developed and the rust resistance becomes excellent. The reason may conceivably be that by making the particle sizes of the Y, La, and Ce compounds and the Ca, Sr, and Ba compounds the same extent, when preparing the slurry, if $X_{R\ E}/X_{G\ 4}$ is in the above-mentioned preferable range, the Ti, Zr, and Hf compounds are arranged near the Y, La, and Ce compounds and regions where the release of oxygen is strengthened can be secured at the sheet surface without unevenness and paths for diffusion of the alkali earth metals which diffuse quickly are maintained even in constant temperature annealing, so more uniform development of the coating is promoted.

On the other hand, if $RA_{AE/RE}$ is outside of the preferable range or $N_{R\ E}$, $N_{G4}$, and $N_{AE}$ are insufficient (less than 2,000,000,000/g), regions where the primary coating has insufficiently developed arise. In this case, the rust resistance falls.

Manufacturing Conditions of Finish Annealing Process

The finish annealing process is for example performed under the following conditions: Drying treatment is performed before the finish annealing. First, the surface of the steel sheet is coated with the aqueous slurry annealing separator. The steel sheet coated on the surface with the annealing separator is loaded into a furnace held at 400 to 1000° C. and held there (drying treatment). Due to this, the annealing separator coated on the surface of the steel sheet is dried. The holding time is for example 10 to 90 seconds.

After the annealing separator is dried, the finish annealing is performed. In the finish annealing, the annealing temperature is made for example 1150 to 1250° C. and the base metal steel sheet (cold rolled steel sheet) is soaked. The soaking time is for example 15 to 30 hours. The internal furnace atmosphere in the finish annealing is a known atmosphere.

In the grain-oriented electrical steel sheet produced by the above manufacturing process, a primary coating containing $Mg_2 SiO_4$ as its main constituent is formed. Furthermore, the Al peak position $D_{Al}$ is arranged in the range of 2.4 to 12.0 µm from the surface of the primary coating. Furthermore, the Al oxide number density ND becomes 0.03 to 0.18/µm$^2$. Furthermore, among the plurality of Al oxides in an observed region at the peak position of the Al emission intensity, the ratio of the total area of the identified Al oxides with a cross-sectional area of 0.4 to 10.0 µm$^2$ to the total cross-sectional area of all Al oxides in the observed region (below, referred to as "the identified Al oxide area ratio RAARE A) becomes 75.0% or more.

Note that, due to the decarburization annealing process and finish annealing process, the elements of the chemical composition of the hot rolled steel sheet are removed to a certain extent from the steel constituents. The change in composition (and process) in the finish annealing process is sometimes called "purification (annealing)". In addition to the Sn, Sb, Bi, Te, and Pb utilized for control of the crystal orientation, S, Al, N, etc. functioning as inhibitors are greatly removed. For this reason, compared with the chemical composition of the hot rolled steel sheet, the above contents of elements in the chemical composition of the base metal steel sheet of the grain-oriented electrical steel sheet become lower as explained above. If using the hot rolled steel sheet of the above-mentioned chemical composition to perform the above method of manufacture, grain-oriented electrical steel sheet having the base metal steel sheet of the above chemical composition can be produced.

Secondary Coating Forming Process

In one example of the method for manufacturing a grain-oriented electrical steel sheet according to the present invention, furthermore, after the finish annealing process, a secondary coating forming process may be undergone. In the secondary coating forming process, the surface of the grain-oriented electrical steel sheet after lowering the temperature in the finish annealing is coated with an insulating coating agent mainly comprised of colloidal silica and a phosphate, then is baked. Due to this, a secondary coating of a high strength insulating coating is formed on the primary coating.
Magnetic Domain Subdivision Treatment Process The grain-oriented electrical steel sheet according to the present invention may further be subjected to a process for treatment to subdivide the magnetic domains after the finish annealing process or secondary coating forming process. In the magnetic domain subdivision treatment process, the surface of the grain-oriented electrical steel sheet is scanned by a laser beam having a magnetic domain subdivision effect or grooves are formed at the surface. In this case, grain-oriented electrical steel sheet with further excellent magnetic properties can be manufactured.

EXAMPLES

Below, aspects of the present invention will be specifically explained by examples. These examples are illustrations for confirming the effects of the present invention and do not limit the present invention.
Manufacture of Grain-Oriented Electrical Steel Sheet Molten steel having each of the chemical compositions shown in Table 1 was produced by a vacuum melting furnace. The molten steel produced was used to manufacture a slab by continuous casting.

TABLE 1

| Steel | Chemical composition (unit: mass %, balance of Fe and impurities) | | | | | | | | | | | | |
|---|---|---|---|---|---|---|---|---|---|---|---|---|---|
| type | C | Si | Mn | S | Se | S + Se | Sol. Al | N | Sn | Sb | Bi | Te | Pb |
| A | 0.077 | 3.3 | 0.080 | 0.025 | — | 0.025 | 0.029 | 0.008 | — | — | — | — | — |
| B | 0.077 | 3.3 | 0.082 | — | 0.033 | 0.033 | 0.032 | 0.008 | — | — | — | — | — |
| C | 0.076 | 3.3 | 0.080 | 0.024 | 0.010 | 0.034 | 0.031 | 0.008 | 0.08 | — | — | — | — |
| D | 0.076 | 3.3 | 0.080 | 0.018 | 0.006 | 0.024 | 0.032 | 0.008 | — | 0.04 | — | — | — |
| E | 0.077 | 3.3 | 0.080 | 0.025 | 0.006 | 0.031 | 0.032 | 0.008 | — | — | 0.004 | — | — |
| F | 0.076 | 3.3 | 0.081 | 0.018 | 0.004 | 0.022 | 0.032 | 0.008 | — | — | — | 0.002 | — |
| G | 0.076 | 3.3 | 0.080 | 0.019 | 0.003 | 0.022 | 0.032 | 0.008 | — | — | — | — | 0.0018 |

The slab was heated at 1350° C. The heated slab was hot rolled to manufacture hot rolled steel sheet having a thickness of 2.3 mm. The chemical composition of the hot rolled steel sheet was the same as the molten steel and was as indicated in Table 1.

The hot rolled steel sheet was treated to anneal it, then the hot rolled steel sheet was pickled. The annealing treatment conditions for the hot rolled steel sheet and the pickling conditions for the hot rolled steel sheet were made the same in each of the numbered tests.

The pickled hot rolled steel sheet was cold rolled to produce cold rolled steel sheet having a thickness of 0.22 mm. In each of the numbered tests, the cold rolling rate was 90.4%.

The cold rolled steel sheet was annealed by primary recrystallization annealing doubling as decarburization annealing. The annealing temperature of the primary recrystallization annealing was, in each of the numbered tests, 750 to 950° C. The holding time at the annealing temperature was 2 minutes.

The cold rolled steel sheet after the primary recrystallization annealing was coated with an aqueous slurry and made to dry to coat the annealing separator by a ratio of 5 g/m² per surface.

Note that, the aqueous slurry was prepared by mixing the annealing separator (raw material powder) and industrial use pure water by a mixing ratio of 1:5. The annealing separator contained MgO and the additives shown in Table 2 and Table 3. Note that, the content $C_{R\,E}$ (mass %) of Y, La, and Ce compounds in the annealing separator shown in Table 2 and Table 3 means the total content of the Y, La, and Ce compounds converted to oxides when defining the MgO in the annealing separator as 100% by mass % (content $C_{R\,E}$ of Y, La, and Ce compounds converted to oxides). In the same way, the abundance ratio $X_{R\,E}$ of Y, La, and Ce shown in Table 2 and Table 3 means the ratio of the sum of the numbers of Y, La, and Ce atoms to the number of Mg atoms contained in the annealing separator. In the same way, the content $C_{G\,4}$ (mass %) of Ti, Zr, and Hf compounds in the annealing separator shown in Table 2 and Table 3 means the total content of Ti, Zr, and Hf compounds converted to oxides when defining the MgO in the annealing separator as 100% by mass % (content $C_{G4}$ of Ti, Zr, and Hf compounds converted to oxides). In the same way, the abundance ratio $X_{G\,4}$ of Ti, Zr, and Hf shown in Table 2 and Table 3 means the ratio of the sum of the numbers of Ti, Zr, and Hf atoms to the number of Mg atoms contained in the annealing separator. In the same way, the content $C_{A\,E}$ (mass %) of Ca, Sr, and Ba compounds in the annealing separator shown in Table 2 and Table 3 means the total content of Ca, Sr, and Ba compounds converted to sulfates when defining the MgO in the annealing separator as 100% by mass % (content $C_{A\,E}$ of Ca, Sr, and Ba compounds converted to sulfates). In the same way, the Y, La, and Ce number density $N_{RE}$ shown in Table 2 and Table 3 means the number density in the raw material powder of particles of a particle size of 0.1 μm or more of compounds of metal selected from Y, La, and Ce in the annealing separator before preparation into the aqueous slurry. In the same way, the Ti, Zr, and Hf number density $N_{G\,4}$ shown in Table 2 and Table 3 means the number density in the raw material powder of particles of a particle size of 0.1 μm or more of compounds of metal selected from Ti, Zr, and Hf in the annealing separator before preparation into the aqueous slurry. In the same way, the Ca, Sr, and Ba number density $N_{A\,E}$ shown in Table 2 and Table 3 means the number density in the raw material powder of particles of a particle size of 0.1 μm or more of compounds of metal selected from Ca, Sr, and Ba in the annealing separator before preparation into the aqueous slurry. Note that, the particles sizes are spherical equivalent diameters based on volume.

TABLE 2

| Test no. | Hot rolled steel sheet steel type | Additives in annealing separator | | | | | | | | | |
|---|---|---|---|---|---|---|---|---|---|---|---|
| | | $Y_2O_3$ content (mass %) | $La_2O_3$ content (mass %) | $CeO_2$ content (mass %) | $TiO_2$ content (mass %) | $ZrO_2$ content (mass %) | $HfO_2$ content (mass %) | $CaSO_4$ content (mass %) | $SrSO_4$ content (mass %) | $BaSO_4$ content (mass %) | Y, La, Ce content $C_{RE}$ (mass %) |
| 1 | A | 0.00 | 0.00 | 0.00 | 0.00 | 0.00 | 0.00 | 0.00 | 0.00 | 0.00 | 0.00 |
| 2 | A | 0.50 | 0.00 | 0.00 | 0.20 | 0.00 | 0.00 | 0.30 | 0.00 | 0.00 | 0.50 |
| 3 | A | 0.00 | 0.00 | 0.00 | 0.75 | 0.00 | 0.00 | 0.15 | 0.00 | 0.00 | 0.00 |
| 4 | A | 0.00 | 0.00 | 0.00 | 0.00 | 0.90 | 0.00 | 0.00 | 0.15 | 0.00 | 0.00 |
| 5 | A | 0.00 | 0.00 | 0.00 | 0.00 | 0.00 | 1.20 | 0.00 | 0.00 | 0.15 | 0.00 |
| 6 | A | 0.00 | 0.00 | 0.00 | 0.00 | 0.00 | 0.00 | 0.15 | 0.00 | 0.00 | 0.00 |
| 7 | A | 0.00 | 0.00 | 0.00 | 0.00 | 0.00 | 0.00 | 0.00 | 0.15 | 0.00 | 0.00 |
| 8 | A | 0.00 | 0.00 | 0.00 | 0.00 | 0.00 | 0.00 | 0.00 | 0.00 | 0.15 | 0.00 |
| 9 | A | 0.00 | 0.00 | 0.00 | 0.75 | 0.00 | 0.00 | 8.50 | 0.00 | 0.00 | 0.00 |
| 10 | A | 0.00 | 0.00 | 0.00 | 0.00 | 0.78 | 0.00 | 1.20 | 0.00 | 0.00 | 0.00 |
| 11 | A | 0.25 | 0.00 | 0.00 | 0.00 | 0.00 | 0.85 | 0.00 | 1.20 | 0.00 | 0.25 |
| 12 | A | 0.00 | 0.30 | 0.00 | 0.70 | 0.00 | 0.00 | 0.15 | 0.00 | 0.00 | 0.30 |
| 13 | A | 0.00 | 0.00 | 0.45 | 0.00 | 0.75 | 0.00 | 0.00 | 0.20 | 0.00 | 0.45 |
| 14 | A | 0.25 | 0.00 | 0.00 | 0.40 | 0.00 | 0.30 | 0.00 | 0.00 | 0.30 | 0.25 |
| 15 | A | 0.00 | 0.25 | 0.00 | 0.50 | 0.20 | 0.00 | 0.00 | 8.50 | 0.00 | 0.25 |
| 16 | A | 0.25 | 0.00 | 0.00 | 0.00 | 0.00 | 1.00 | 0.00 | 1.20 | 0.00 | 0.25 |
| 17 | A | 0.00 | 0.00 | 0.25 | 1.00 | 1.50 | 0.00 | 0.00 | 0.00 | 1.50 | 0.25 |
| 18 | A | 0.25 | 0.00 | 0.00 | 0.70 | 0.00 | 0.00 | 1.20 | 0.00 | 0.00 | 0.25 |
| 19 | A | 0.20 | 0.35 | 0.00 | 0.50 | 0.00 | 0.00 | 3.40 | 0.00 | 0.00 | 0.55 |
| 20 | A | 0.00 | 0.85 | 0.00 | 0.00 | 0.00 | 0.00 | 1.20 | 0.00 | 0.00 | 0.85 |
| 21 | A | 0.00 | 0.00 | 0.00 | 1.00 | 0.00 | 0.00 | 0.00 | 0.00 | 0.00 | 0.00 |
| 22 | A | 0.15 | 0.00 | 0.25 | 0.55 | 0.00 | 0.00 | 1.20 | 0.00 | 0.00 | 0.40 |
| 23 | A | 0.85 | 0.00 | 0.00 | 0.50 | 0.00 | 0.00 | 0.00 | 0.00 | 0.00 | 0.85 |
| 24 | A | 0.00 | 0.00 | 0.85 | 0.50 | 0.00 | 0.00 | 0.00 | 0.00 | 0.15 | 0.85 |
| 25 | A | 0.90 | 0.00 | 0.00 | 1.30 | 0.00 | 0.00 | 0.30 | 0.50 | 0.00 | 0.90 |
| 26 | A | 0.00 | 0.90 | 0.00 | 1.00 | 0.00 | 0.50 | 0.00 | 0.00 | 1.20 | 0.90 |
| 27 | A | 0.00 | 0.00 | 1.00 | 0.00 | 0.50 | 1.00 | 3.60 | 0.00 | 0.00 | 1.00 |
| 28 | A | 0.85 | 0.00 | 0.00 | 0.50 | 0.00 | 0.00 | 0.00 | 0.00 | 8.50 | 0.85 |
| 29 | A | 0.00 | 0.85 | 0.00 | 0.00 | 0.00 | 0.50 | 1.20 | 0.00 | 0.00 | 0.85 |
| 30 | A | 0.00 | 0.00 | 0.85 | 0.50 | 0.00 | 0.00 | 0.00 | 1.20 | 0.00 | 0.85 |
| 31 | A | 0.00 | 0.00 | 1.50 | 0.00 | 0.50 | 0.00 | 1.20 | 0.00 | 0.00 | 1.50 |
| 32 | A | 1.20 | 0.00 | 0.50 | 0.20 | 0.00 | 0.00 | 0.00 | 1.25 | 0.00 | 1.70 |
| 33 | A | 0.00 | 0.00 | 0.00 | 0.00 | 4.00 | 0.00 | 0.00 | 0.00 | 1.80 | 0.00 |
| 34 | A | 0.40 | 0.00 | 0.00 | 4.00 | 0.00 | 0.00 | 1.20 | 0.00 | 1.20 | 0.40 |
| 35 | A | 2.00 | 0.00 | 0.00 | 0.00 | 2.00 | 0.00 | 0.00 | 1.50 | 0.00 | 2.00 |
| 36 | A | 0.00 | 3.00 | 0.00 | 0.00 | 1.00 | 0.00 | 0.00 | 1.50 | 0.00 | 3.00 |
| 37 | A | 4.00 | 0.00 | 0.00 | 0.00 | 0.00 | 0.00 | 1.20 | 0.00 | 0.00 | 4.00 |
| 38 | A | 0.00 | 0.00 | 0.00 | 6.00 | 0.00 | 0.00 | 1.20 | 0.00 | 0.00 | 0.00 |
| 39 | B | 0.00 | 0.50 | 0.00 | 0.00 | 2.00 | 7.50 | 1.20 | 0.00 | 0.00 | 0.50 |
| 40 | B | 0.00 | 0.00 | 3.00 | 0.00 | 0.00 | 3.00 | 0.00 | 1.50 | 0.00 | 3.00 |
| 41 | B | 0.00 | 5.20 | 0.00 | 0.50 | 0.00 | 0.00 | 0.00 | 1.50 | 0.00 | 5.20 |
| 42 | B | 0.00 | 0.00 | 6.00 | 0.00 | 0.00 | 0.00 | 0.00 | 0.00 | 1.80 | 6.00 |
| 43 | B | 1.00 | 2.00 | 3.00 | 0.00 | 0.00 | 2.10 | 0.00 | 0.00 | 1.80 | 6.00 |
| 44 | B | 6.00 | 0.00 | 0.00 | 2.00 | 0.00 | 0.00 | 0.00 | 0.00 | 1.80 | 6.00 |
| 45 | B | 0.00 | 7.00 | 0.00 | 0.00 | 0.00 | 6.00 | 1.20 | 0.00 | 0.00 | 7.00 |
| 46 | B | 0.00 | 8.50 | 0.00 | 0.00 | 2.50 | 0.00 | 0.00 | 2.50 | 0.00 | 8.50 |
| 47 | B | 4.50 | 0.00 | 0.00 | 6.00 | 0.00 | 5.00 | 1.20 | 0.00 | 0.00 | 4.50 |
| 48 | B | 1.20 | 0.00 | 0.00 | 0.20 | 0.00 | 0.00 | 1.20 | 0.00 | 0.00 | 1.20 |
| 49 | B | 0.00 | 0.00 | 1.40 | 3.00 | 3.00 | 0.00 | 0.00 | 0.00 | 1.50 | 1.40 |
| 50 | B | 0.50 | 0.00 | 0.00 | 0.25 | 0.00 | 0.00 | 0.00 | 2.00 | 0.00 | 0.50 |

| Test no. | Additives in annealing separator | | | | | | Raw material powder | | | Remarks |
|---|---|---|---|---|---|---|---|---|---|---|
| | Ti, Zr, Hf content $C_{G4}$ (mass %) | Total content $C_{RE} + C_{G4}$ (mass %) | Ca, Sr, Ba content $C_{AE}$ (mass %) | Mean particle size $PS_{RE}$ (µm) | Mean particle size $PS_{AE}$ (µm) | $RA_{AE/RE}$ | $X_{RE}/X_{G4}$ | Y, La, Ce number density $N_{RE}$ (100,000,000/g) | Ti, Zr, Hf number density $N_{G4}$ (100,000,000/g) | Ca, Sr, Ba number density $N_{AE}$ (100,000,000/g) | |
| 1 | 0.00 | 0.00 | 0.00 | — | — | — | — | — | — | — | Comp. ex. |
| 2 | 0.20 | 0.70 | 0.30 | 5.60 | 8.40 | 1.50 | 1.77 | 51.5 | 49.8 | 42.2 | Comp. ex. |
| 3 | 0.75 | 0.75 | 0.15 | — | 8.40 | — | 0.00 | — | 49.8 | 42.2 | Comp. ex. |
| 4 | 0.90 | 0.90 | 0.15 | — | 8.40 | — | 0.00 | — | 35.4 | 42.2 | Comp. ex. |
| 5 | 1.20 | 1.20 | 0.15 | — | 8.40 | — | 0.00 | — | 72.1 | 42.2 | Comp. ex. |
| 6 | 0.00 | 0.00 | 0.15 | — | 8.40 | — | — | — | — | 42.2 | Comp. ex. |
| 7 | 0.00 | 0.00 | 0.15 | — | 9.40 | — | — | — | — | 51.5 | Comp. ex. |
| 8 | 0.00 | 0.00 | 0.15 | — | 10.40 | — | — | — | — | 41.8 | Comp. ex. |
| 9 | 0.75 | 0.75 | 8.50 | — | 8.40 | — | 0.00 | — | 49.8 | 62.1 | Comp. ex. |
| 10 | 0.78 | 0.78 | 1.20 | — | 13.00 | — | 0.00 | — | 35.4 | 54.5 | Comp. ex. |
| 11 | 0.85 | 1.10 | 1.20 | 5.60 | 8.40 | 1.50 | 0.55 | 51.5 | 72.1 | 34.4 | Comp. ex. |
| 12 | 0.70 | 1.00 | 0.15 | 5.60 | 8.40 | 1.50 | 0.21 | 51.5 | 49.8 | 38.2 | Comp. ex. |
| 13 | 0.75 | 1.20 | 0.20 | 5.60 | 8.40 | 1.50 | 0.43 | 51.5 | 35.4 | 39.1 | Comp. ex. |

TABLE 2-continued

| | | | | | | | | | | | |
|---|---|---|---|---|---|---|---|---|---|---|---|
| 14 | 0.70 | 0.95 | 0.30 | 5.60 | 8.40 | 1.50 | 0.34 | 51.5 | 68.1 | 64.4 | Comp. ex. |
| 15 | 0.70 | 0.95 | 8.50 | 5.60 | 8.40 | 1.50 | 0.19 | 51.5 | 42.2 | 72.5 | Comp. ex. |
| 16 | 1.00 | 1.25 | 1.20 | 5.60 | 13.00 | 2.32 | 0.47 | 51.5 | 72.1 | 21.8 | Comp. ex. |
| 17 | 2.50 | 2.75 | 1.50 | 2.63 | 8.40 | 3.20 | 0.06 | 182.0 | 43.5 | 42.1 | Comp. ex. |
| 18 | 0.70 | 0.95 | 1.20 | 21.00 | 8.40 | 0.40 | 0.25 | 21.2 | 49.8 | 29.9 | Comp. ex. |
| 19 | 0.50 | 1.05 | 3.40 | 5.60 | 8.40 | 1.50 | 0.63 | 62.2 | 49.8 | 35.5 | Comp. ex. |
| 20 | 0.00 | 0.85 | 1.20 | 5.60 | 8.40 | 1.50 | — | 62.2 | — | 42.5 | Comp. ex. |
| 21 | 1.00 | 1.00 | 0.00 | — | — | — | 0.00 | — | 49.8 | — | Comp. ex. |
| 22 | 0.55 | 0.95 | 1.20 | 5.60 | 8.40 | 1.50 | 0.40 | 62.2 | 49.8 | 45.3 | Comp. ex. |
| 23 | 0.50 | 1.35 | 0.00 | 5.60 | — | — | 1.20 | 62.2 | 49.8 | — | Comp. ex. |
| 24 | 0.50 | 1.35 | 0.15 | 5.60 | 8.40 | 1.50 | 0.79 | 62.2 | 49.8 | 77.1 | Comp. ex. |
| 25 | 1.30 | 2.20 | 0.80 | 5.60 | 8.40 | 1.50 | 0.49 | 51.5 | 49.8 | 76.9 | Inv. ex. |
| 26 | 1.50 | 2.40 | 1.20 | 5.60 | 8.40 | 1.50 | 0.37 | 62.2 | 61.5 | 64.8 | Inv. ex. |
| 27 | 1.50 | 2.50 | 3.60 | 5.60 | 8.40 | 1.50 | 0.66 | 103.5 | 59.5 | 62.2 | Inv. ex. |
| 28 | 0.50 | 1.35 | 8.50 | 5.60 | 8.40 | 1.50 | 1.20 | 62.2 | 49.8 | 42.8 | Comp. ex. |
| 29 | 0.50 | 1.35 | 1.20 | 5.60 | 13.00 | 2.32 | 2.20 | 62.2 | 72.1 | 63.5 | Comp. ex. |
| 30 | 0.50 | 1.35 | 1.20 | 2.63 | 8.40 | 3.20 | 0.79 | 193.8 | 49.8 | 54.2 | Comp. ex. |
| 31 | 0.50 | 2.00 | 1.20 | 9.80 | 0.80 | 0.08 | 2.15 | 22.5 | 35.4 | 19883.2 | Comp. ex. |
| 32 | 0.20 | 1.90 | 1.25 | 5.60 | 8.40 | 1.50 | 5.40 | 103.5 | 49.8 | 72.8 | Comp. ex. |
| 33 | 4.00 | 4.00 | 1.80 | — | 8.40 | — | 0.00 | — | 35.4 | 96.6 | Comp. ex. |
| 34 | 4.00 | 4.40 | 2.40 | 5.60 | 8.40 | 1.50 | 0.07 | 62.2 | 49.8 | 45.5 | Comp. ex. |
| 35 | 2.00 | 4.00 | 1.50 | 5.60 | 8.40 | 1.50 | 1.09 | 62.2 | 35.4 | 51.1 | Inv. ex. |
| 36 | 1.00 | 4.00 | 1.50 | 5.60 | 8.40 | 1.50 | 2.27 | 62.2 | 35.4 | 51.1 | Inv. ex. |
| 37 | 0.00 | 4.00 | 1.20 | 5.60 | 8.40 | 1.50 | — | 62.2 | — | 63.2 | Comp. ex. |
| 38 | 6.00 | 6.00 | 1.20 | — | 8.40 | — | 0.00 | — | 49.8 | 63.2 | Comp. ex. |
| 39 | 9.50 | 10.00 | 1.20 | 5.60 | 8.40 | 1.50 | 0.06 | 28.2 | 62.4 | 63.2 | Comp. ex. |
| 40 | 3.00 | 6.00 | 1.50 | 5.60 | 8.40 | 1.50 | 1.22 | 28.2 | 72.1 | 51.1 | Inv. ex. |
| 41 | 0.50 | 5.70 | 1.50 | 5.60 | 8.40 | 1.50 | 5.10 | 28.2 | 49.8 | 51.1 | Comp. ex. |
| 42 | 0.00 | 6.00 | 1.80 | 5.60 | 8.40 | 1.50 | — | 28.2 | — | 96.6 | Comp. ex. |
| 43 | 2.10 | 8.10 | 1.80 | 5.60 | 8.40 | 1.50 | 3.86 | 28.2 | 72.1 | 96.6 | Inv. ex. |
| 44 | 2.00 | 8.00 | 1.80 | 5.60 | 8.40 | 1.50 | 2.12 | 28.2 | 49.8 | 96.6 | Inv. ex. |
| 45 | 6.00 | 13.00 | 1.20 | 5.60 | 8.40 | 1.50 | 1.51 | 28.2 | 72.1 | 63.2 | Comp. ex. |
| 46 | 2.50 | 11.00 | 2.50 | 5.60 | 8.40 | 1.50 | 2.57 | 28.2 | 35.4 | 51.1 | Comp. ex. |
| 47 | 11.00 | 15.50 | 1.20 | 5.60 | 8.40 | 1.50 | 0.40 | 28.2 | 42.5 | 63.2 | Comp. ex. |
| 48 | 0.20 | 1.40 | 1.20 | 5.60 | 8.40 | 1.50 | 4.24 | 28.2 | 49.8 | 63.2 | Comp. ex. |
| 49 | 6.00 | 7.40 | 1.50 | 5.60 | 8.40 | 1.50 | 0.13 | 28.2 | 42.1 | 96.6 | Comp. ex. |
| 50 | 0.25 | 0.75 | 2.00 | 5.60 | 8.40 | 1.50 | 1.41 | 28.2 | 49.8 | 51.1 | Comp. ex. |

TABLE 3

| | | Additives in annealing separator | | | | | | | | | |
|---|---|---|---|---|---|---|---|---|---|---|---|
| Test no. | Hot rolled steel sheet steel type | $Y_2O_3$ content (mass %) | $La_2O_3$ content (mass %) | $CeO_2$ content (mass %) | $TiO_2$ content (mass %) | $ZrO_2$ content (mass %) | $HfO_2$ content (mass %) | $CaSO_4$ content (mass %) | $SrSO_4$ content (mass %) | $BaSO_4$ content (mass %) | Y, La, Ce content $C_{RE}$ (mass %) |
| 51 | C | 0.00 | 1.80 | 0.00 | 0.90 | 0.50 | 0.00 | 0.00 | 0.00 | 1.80 | 1.80 |
| 52 | D | 0.00 | 0.00 | 1.50 | 0.90 | 0.00 | 0.50 | 1.20 | 0.00 | 0.00 | 1.50 |
| 53 | E | 2.00 | 0.00 | 0.00 | 0.00 | 1.00 | 1.00 | 0.00 | 1.50 | 0.00 | 2.00 |
| 54 | F | 0.00 | 0.00 | 1.40 | 0.00 | 1.00 | 0.50 | 0.00 | 0.00 | 1.80 | 1.40 |
| 55 | G | 1.80 | 0.00 | 0.00 | 3.00 | 0.00 | 1.50 | 1.20 | 0.00 | 0.00 | 1.80 |
| 56 | B | 2.00 | 1.50 | 0.00 | 2.50 | 0.00 | 0.00 | 0.00 | 0.00 | 1.20 | 3.50 |
| 57 | A | 3.50 | 0.00 | 0.00 | 0.00 | 2.50 | 0.00 | 0.00 | 0.00 | 0.00 | 3.50 |
| 58 | A | 3.50 | 0.00 | 0.00 | 0.00 | 0.00 | 2.50 | 0.15 | 0.00 | 0.00 | 3.50 |
| 59 | A | 0.00 | 0.00 | 3.50 | 0.00 | 0.00 | 2.50 | 1.20 | 0.00 | 0.00 | 3.50 |
| 60 | B | 0.00 | 0.00 | 3.50 | 0.00 | 2.50 | 0.00 | 0.00 | 3.50 | 0.00 | 3.50 |
| 61 | B | 0.00 | 0.00 | 3.50 | 0.00 | 0.00 | 2.50 | 7.20 | 2.00 | 0.00 | 3.50 |
| 62 | B | 0.00 | 3.50 | 0.00 | 0.00 | 0.00 | 2.50 | 0.00 | 1.20 | 0.00 | 3.50 |
| 63 | B | 0.00 | 0.00 | 3.50 | 0.00 | 5.00 | 0.00 | 1.20 | 0.00 | 0.00 | 3.50 |
| 64 | B | 3.50 | 0.00 | 0.00 | 0.00 | 5.00 | 0.00 | 1.50 | 0.00 | 0.00 | 3.50 |
| 65 | B | 0.00 | 3.50 | 0.00 | 2.50 | 0.00 | 2.00 | 0.00 | 0.00 | 0.00 | 3.50 |
| 66 | B | 0.00 | 0.00 | 3.50 | 2.50 | 0.00 | 0.00 | 0.00 | 1.50 | 0.00 | 3.50 |
| 67 | B | 1.50 | 2.00 | 0.00 | 1.50 | 2.50 | 0.00 | 0.00 | 2.00 | 0.00 | 3.50 |
| 68 | B | 1.50 | 0.00 | 2.00 | 1.50 | 0.00 | 2.50 | 0.00 | 0.00 | 1.50 | 3.50 |
| 69 | B | 1.50 | 2.00 | 0.00 | 0.00 | 0.00 | 2.50 | 1.20 | 0.00 | 0.00 | 3.50 |
| 70 | B | 0.00 | 0.00 | 3.50 | 2.50 | 0.00 | 0.00 | 1.20 | 1.50 | 0.00 | 3.50 |
| 71 | B | 2.00 | 1.50 | 0.00 | 0.00 | 2.50 | 0.00 | 0.00 | 0.00 | 2.00 | 3.50 |
| 72 | B | 2.00 | 0.00 | 1.50 | 0.00 | 0.00 | 2.00 | 3.00 | 0.00 | 0.00 | 3.50 |
| 73 | B | 0.00 | 1.50 | 2.00 | 0.00 | 0.00 | 2.50 | 0.00 | 3.00 | 0.00 | 3.50 |
| 74 | B | 0.00 | 0.00 | 1.50 | 0.00 | 0.00 | 3.00 | 0.00 | 0.00 | 3.00 | 3.00 |
| 75 | B | 0.00 | 1.50 | 2.00 | 5.00 | 5.50 | 0.00 | 1.20 | 0.00 | 0.00 | 3.50 |
| 76 | B | 0.00 | 1.00 | 2.00 | 2.50 | 0.00 | 0.00 | 1.20 | 0.00 | 1.80 | 3.00 |
| 77 | B | 1.50 | 2.00 | 0.00 | 0.00 | 0.00 | 2.50 | 0.00 | 1.20 | 0.00 | 3.50 |
| 78 | B | 2.00 | 0.00 | 1.00 | 0.00 | 0.00 | 2.50 | 0.00 | 0.00 | 2.40 | 3.00 |
| 79 | B | 0.00 | 1.50 | 2.00 | 1.50 | 0.00 | 1.00 | 0.00 | 0.00 | 1.50 | 3.50 |
| 80 | B | 2.00 | 1.00 | 0.00 | 0.50 | 2.00 | 0.00 | 1.50 | 0.00 | 0.00 | 3.00 |

TABLE 3-continued

| | | | | | | | | | | | |
|---|---|---|---|---|---|---|---|---|---|---|---|
| 81 | B | 1.00 | 1.00 | 1.00 | 1.50 | 1.50 | 0.00 | 3.00 | 0.00 | 0.20 | 3.00 |
| 82 | B | 2.00 | 0.00 | 1.00 | 0.00 | 0.00 | 2.50 | 1.00 | 1.50 | 0.00 | 3.00 |
| 83 | A | 1.50 | 0.00 | 0.00 | 1.80 | 0.00 | 0.00 | 0.00 | 0.00 | 0.00 | 1.50 |
| 84 | A | 0.00 | 0.00 | 1.60 | 0.00 | 0.00 | 0.00 | 0.00 | 1.60 | 0.00 | 1.60 |
| 85 | B | 1.80 | 0.00 | 0.00 | 2.50 | 0.00 | 0.00 | 2.10 | 0.00 | 0.00 | 1.80 |
| 86 | B | 0.00 | 2.10 | 0.00 | 0.00 | 0.00 | 3.10 | 1.50 | 1.80 | 0.00 | 2.10 |
| 87 | A | 0.00 | 0.00 | 2.10 | 2.80 | 1.40 | 0.00 | 0.00 | 0.00 | 2.44 | 2.10 |
| 88 | B | 0.00 | 1.20 | 1.50 | 0.00 | 0.00 | 4.10 | 0.00 | 3.22 | 0.00 | 2.70 |
| 89 | A | 1.30 | 0.00 | 0.00 | 1.22 | 0.00 | 0.00 | 0.00 | 0.00 | 0.00 | 1.30 |
| 90 | A | 0.00 | 0.00 | 0.00 | 0.00 | 1.42 | 0.00 | 0.00 | 1.40 | 0.00 | 0.00 |
| 91 | B | 0.00 | 1.51 | 0.00 | 0.00 | 0.00 | 1.57 | 1.88 | 0.00 | 0.00 | 1.51 |
| 92 | B | 0.82 | 0.00 | 1.54 | 3.22 | 0.00 | 0.00 | 0.00 | 2.41 | 0.00 | 2.36 |
| 93 | A | 0.00 | 0.00 | 1.88 | 0.00 | 1.99 | 0.00 | 1.55 | 0.00 | 0.52 | 1.88 |
| 94 | B | 0.00 | 3.55 | 0.00 | 1.85 | 0.00 | 3.22 | 0.00 | 3.22 | 0.00 | 3.55 |
| 95 | A | 1.20 | 0.00 | 0.00 | 0.00 | 0.00 | 0.00 | 0.82 | 0.00 | 0.00 | 1.20 |
| 96 | A | 0.00 | 0.00 | 0.00 | 0.00 | 1.43 | 0.00 | 0.00 | 0.00 | 1.55 | 0.00 |
| 97 | B | 0.00 | 0.00 | 2.15 | 0.00 | 0.00 | 2.80 | 0.00 | 3.22 | 0.00 | 2.15 |
| 98 | B | 1.58 | 1.42 | 0.00 | 3.50 | 0.00 | 0.00 | 3.80 | 0.00 | 0.00 | 3.00 |
| 99 | A | 0.00 | 0.00 | 4.11 | 0.00 | 1.58 | 2.42 | 0.00 | 3.55 | 0.00 | 4.11 |
| 100 | B | 0.00 | 4.52 | 0.00 | 0.00 | 0.00 | 3.52 | 4.20 | 0.00 | 2.50 | 4.52 |

| | Additives in annealing separator | | | | | | | Raw material powder | | | |
|---|---|---|---|---|---|---|---|---|---|---|---|
| | | | | | | | | Y, La, Ce | Ti, Zr, Hf | Ca, Sr, Ba | |
| Test no. | Ti, Zr, Hf content $C_{G4}$ (mass %) | Total content $C_{RE} + C_{G4}$ (mass %) | Ca, Sr, Ba content $C_{AE}$ (mass %) | Mean particle size $PS_{RE}$ (μm) | Mean particle size $PS_{AE}$ (μm) | $RA_{AE/RE}$ | $X_{RE}/X_{G4}$ | number density $N_{RE}$ (100,000,000/g) | number density $N_{G4}$ (100,000,000/g) | number density $N_{AE}$ (100,000,000/g) | Remarks |
| 51 | 1.40 | 3.20 | 1.80 | 5.60 | 8.40 | 1.50 | 0.72 | 28.2 | 38.8 | 96.6 | Inv. ex. |
| 52 | 1.40 | 2.90 | 1.20 | 5.60 | 8.40 | 1.50 | 0.64 | 51.5 | 72.1 | 63.2 | Inv. ex. |
| 53 | 2.00 | 4.00 | 1.50 | 5.60 | 8.40 | 1.50 | 1.38 | 62.2 | 64.4 | 51.1 | Inv. ex. |
| 54 | 1.50 | 2.90 | 1.80 | 5.60 | 8.40 | 1.50 | 0.78 | 108.2 | 62.2 | 96.6 | Inv. ex. |
| 55 | 4.50 | 6.30 | 1.20 | 5.60 | 8.40 | 1.50 | 0.36 | 304.5 | 72.1 | 63.2 | Inv. ex. |
| 56 | 2.50 | 6.00 | 1.20 | 0.73 | 3.29 | 4.50 | 0.86 | 9821.2 | 49.8 | 96.6 | Comp. ex. |
| 57 | 2.50 | 6.00 | 0.00 | 5.60 | — | — | 1.53 | 28.2 | 35.4 | — | Comp. ex. |
| 58 | 2.50 | 6.00 | 0.15 | 5.60 | 8.40 | 1.50 | 2.61 | 32.0 | 72.1 | 63.2 | Comp. ex. |
| 59 | 2.50 | 6.00 | 1.20 | 1.63 | 2.45 | 1.50 | 1.71 | 829.4 | 72.1 | 922.1 | Inv. ex. |
| 60 | 2.50 | 6.00 | 3.50 | 5.60 | 8.40 | 1.50 | 1.00 | 32.0 | 35.4 | 51.1 | Inv. ex. |
| 61 | 2.50 | 6.00 | 9.20 | 5.60 | 8.40 | 1.50 | 1.71 | 32.0 | 72.1 | 62.1 | Comp. ex. |
| 62 | 2.50 | 6.00 | 1.20 | 5.60 | 13.00 | 2.32 | 1.81 | 32.0 | 72.1 | 42.1 | Comp. ex. |
| 63 | 5.00 | 8.50 | 1.20 | 2.63 | 8.40 | 3.20 | 0.50 | 405.8 | 35.4 | 63.2 | Comp. ex. |
| 64 | 5.00 | 8.50 | 1.50 | 4.20 | 0.38 | 0.09 | 0.76 | 58.6 | 35.4 | 160921.5 | Comp. ex. |
| 65 | 2.50 | 6.00 | 2.00 | 1.09 | 0.10 | 0.09 | 0.69 | 3255.4 | 49.8 | 823462.4 | Comp. ex. |
| 66 | 2.50 | 6.00 | 1.50 | 2.23 | 0.13 | 0.06 | 0.65 | 351.2 | 49.8 | 623373.5 | Comp. ex. |
| 67 | 4.00 | 7.50 | 2.00 | 2.58 | 0.24 | 0.09 | 0.65 | 281.6 | 55.3 | 724493.2 | Comp. ex. |
| 68 | 4.00 | 7.50 | 1.50 | 3.77 | 0.20 | 0.05 | 0.81 | 244.4 | 72.1 | 694299.5 | Comp. ex. |
| 69 | 2.50 | 6.00 | 1.20 | 1.66 | 4.83 | 2.90 | 2.15 | 914.5 | 72.1 | 108.5 | Inv. ex. |
| 70 | 2.50 | 6.00 | 2.70 | 3.24 | 4.86 | 1.50 | 0.65 | 351.9 | 49.8 | 301.4 | Inv. ex. |
| 71 | 2.50 | 6.00 | 2.00 | 2.15 | 0.19 | 0.09 | 1.33 | 482.1 | 35.4 | 881762.4 | Comp. ex. |
| 72 | 2.00 | 5.50 | 3.00 | 4.41 | 0.27 | 0.06 | 2.78 | 82.6 | 72.1 | 531523.7 | Comp. ex. |
| 73 | 2.50 | 6.00 | 3.00 | 5.13 | 0.42 | 0.08 | 1.75 | 40.6 | 72.1 | 218862.0 | Comp. ex. |
| 74 | 3.00 | 6.50 | 3.00 | 14.92 | 1.20 | 0.08 | 1.47 | 24.8 | 72.1 | 5242.8 | Comp. ex. |
| 75 | 10.50 | 14.00 | 1.20 | 1.65 | 9.88 | 6.00 | 0.19 | 911.4 | 41.1 | 20.5 | Comp. ex. |
| 76 | 2.50 | 5.50 | 3.00 | 3.60 | 9.72 | 2.70 | 0.57 | 98.5 | 49.8 | 20.4 | Inv. ex. |
| 77 | 2.50 | 6.00 | 1.20 | 9.33 | 8.40 | 0.90 | 2.15 | 21.2 | 72.1 | 43.5 | Inv. ex. |
| 78 | 2.50 | 5.50 | 2.40 | 8.21 | 11.50 | 1.40 | 1.98 | 21.6 | 72.1 | 21.8 | Inv. ex. |
| 79 | 2.50 | 6.00 | 1.50 | 2.72 | 14.30 | 5.25 | 0.89 | 203.5 | 55.4 | 62.4 | Comp. ex. |
| 80 | 2.50 | 5.50 | 1.50 | 3.04 | 22.81 | 7.50 | 1.06 | 151.5 | 41.2 | 20.4 | Comp. ex. |
| 81 | 3.00 | 6.00 | 3.20 | 10.04 | 0.80 | 0.08 | 0.67 | 21.5 | 42.5 | 17099.5 | Comp. ex. |
| 82 | 2.50 | 5.50 | 2.50 | 14.00 | 24.51 | 1.75 | 1.98 | 23.4 | 72.1 | 21.8 | Comp. ex. |
| 83 | 1.80 | 3.30 | 0.00 | 6.22 | — | — | 0.83 | 18.4 | 49.8 | — | Comp. ex. |
| 84 | 0.00 | 1.60 | 1.60 | 5.88 | 3.26 | 0.64 | — | 19.2 | — | 302.6 | Comp. ex. |
| 85 | 2.50 | 4.30 | 2.10 | 6.88 | 2.1 | 0.87 | 0.72 | 14.2 | 49.8 | 901.4 | Comp. ex. |
| 86 | 3.10 | 5.20 | 3.30 | 5.85 | 4.12 | 1.28 | 0.68 | 19.8 | 72.1 | 132.8 | Comp. ex. |
| 87 | 4.20 | 6.30 | 2.44 | 5.22 | 1.46 | 0.30 | 0.50 | 17.2 | 41.2 | 2755.6 | Comp. ex. |
| 88 | 4.10 | 6.80 | 3.22 | 6.14 | 3.22 | 0.77 | 0.66 | 16.9 | 72.1 | 259.5 | Comp. ex. |
| 89 | 1.22 | 2.52 | 0.00 | 2.55 | — | — | 1.07 | 242.7 | 18.2 | — | Comp. ex. |
| 90 | 1.42 | 1.42 | 1.40 | — | 1.55 | — | — | — | 17.5 | 4499.5 | Comp. ex. |
| 91 | 1.57 | 3.08 | 1.88 | 3.55 | 3.82 | 1.08 | 0.96 | 105.2 | 16.2 | 157.3 | Comp. ex. |
| 92 | 3.22 | 5.58 | 2.41 | 6.12 | 3.88 | 0.63 | 0.73 | 25.5 | 15.7 | 159.5 | Comp. ex. |
| 93 | 1.99 | 3.87 | 2.07 | 1.55 | 3.15 | 2.03 | 0.94 | 2013.1 | 19.2 | 337.2 | Comp. ex. |
| 94 | 5.07 | 8.62 | 3.22 | 2.11 | 4.25 | 2.01 | 0.70 | 508.4 | 16.8 | 60.5 | Comp. ex. |
| 95 | 0.00 | 1.20 | 0.82 | 2.66 | 7.92 | 2.04 | — | 305.4 | — | 18.4 | Comp. ex. |
| 96 | 1.43 | 1.43 | 1.55 | — | 6.12 | — | — | — | 35.4 | 19.2 | Comp. ex. |
| 97 | 2.80 | 4.95 | 3.22 | 2.44 | 7.33 | 2.92 | 0.77 | 299.1 | 72.1 | 19.4 | Comp. ex. |
| 98 | 3.50 | 6.50 | 3.80 | 3.98 | 7.55 | 1.62 | 0.86 | 139.6 | 49.8 | 19.8 | Comp. ex. |

TABLE 3-continued

| | | | | | | | | | | |
|---|---|---|---|---|---|---|---|---|---|---|
| 99 | 4.00 | 8.11 | 3.55 | 1.42 | 7.77 | 2.73 | 1.03 | 1544.7 | 67.7 | 17.5 | Comp. ex. |
| 100 | 3.52 | 8.04 | 6.70 | 1.77 | 7.35 | 2.38 | 1.28 | 793.1 | 72.1 | 19.3 | Comp. ex. |

The mean particle size $PS_{AE}$ (μm) in Table 2 and Table 3 means the mean particle size of Ca, Sr, and Ba compounds measured by the above measurement method. The mean particle size $PS_{RE}$ (μm) in Table 2 and Table 3 means the mean particle size of Y, La, and Ce compounds measured by the above measurement method. The $RA_{AE/RE}$ in Table 2 and Table 3 means the ratio of the mean particle size of Ca, Sr, and Ba compounds to the mean particle size of Y, La, and Ce compounds measured by the above measurement method.

The cold rolled steel sheet on the surface of which the aqueous slurry was coated was, in each of the numbered tests, treated to dry it at 900° C. for 10 seconds to dry the aqueous slurry. After drying, it was treated by finish annealing. In the finish annealing treatment, in each of the numbered tests, the sheet was held at 1200° C. for 20 hours. Due to the above manufacturing process, grain-oriented electrical steel sheet having a base metal steel sheet and a primary coating was manufactured.

Analysis of Chemical Composition of Base Metal Steel Sheet of Grain-Oriented Electrical Steel Sheet The base metal steel sheets of the grain-oriented electrical steel sheets of Test Nos. 1 to 100 manufactured were examined by spark discharge optical emission spectrometry and atomic absorption spectrometry to find the chemical compositions of the base metal steel sheets. The found chemical compositions are shown in Table 4 and Table 5.

TABLE 4

| Test no. | Chemical composition (unit: mass %, balance of Fe and impurities) | | | | | | | | | | | | |
|---|---|---|---|---|---|---|---|---|---|---|---|---|---|
| | C | Si | Mn | S | Se | S + Se | Sol. Al | N | Sn | Sb | Bi | Te | Pb |
| 1 | 0.0005 | 3.3 | 0.079 | 0.001 | <0.0005 | <0.0015 | 0.002 | 0.002 | <0.0005 | <0.0005 | <0.0005 | <0.0005 | <0.0005 |
| 2 | 0.0005 | 3.3 | 0.079 | 0.001 | <0.0005 | <0.0015 | 0.001 | 0.003 | <0.0005 | <0.0005 | <0.0005 | <0.0005 | <0.0005 |
| 3 | 0.0005 | 3.3 | 0.080 | 0.001 | <0.0005 | <0.0015 | 0.002 | 0.002 | <0.0005 | <0.0005 | <0.0005 | <0.0005 | <0.0005 |
| 4 | 0.0005 | 3.3 | 0.080 | 0.001 | <0.0005 | <0.0015 | 0.002 | 0.002 | <0.0005 | <0.0005 | <0.0005 | <0.0005 | <0.0005 |
| 5 | 0.0005 | 3.3 | 0.080 | 0.001 | <0.0005 | <0.0015 | 0.001 | 0.002 | <0.0005 | <0.0005 | <0.0005 | <0.0005 | <0.0005 |
| 6 | 0.0005 | 3.3 | 0.077 | 0.001 | <0.0005 | <0.0015 | 0.001 | 0.002 | <0.0005 | <0.0005 | <0.0005 | <0.0005 | <0.0005 |
| 7 | 0.0005 | 3.3 | 0.079 | 0.001 | <0.0005 | <0.0015 | 0.001 | 0.003 | <0.0005 | <0.0005 | <0.0005 | <0.0005 | <0.0005 |
| 8 | 0.0005 | 3.3 | 0.079 | 0.001 | <0.0005 | <0.0015 | 0.001 | 0.003 | <0.0005 | <0.0005 | <0.0005 | <0.0005 | <0.0005 |
| 9 | 0.0005 | 3.3 | 0.078 | 0.001 | <0.0005 | <0.0015 | 0.002 | 0.001 | <0.0005 | <0.0005 | <0.0005 | <0.0005 | <0.0005 |
| 10 | 0.0005 | 3.3 | 0.079 | 0.001 | <0.0005 | <0.0015 | 0.002 | 0.001 | <0.0005 | <0.0005 | <0.0005 | <0.0005 | <0.0005 |
| 11 | 0.0005 | 3.3 | 0.079 | 0.001 | <0.0005 | <0.0015 | 0.003 | 0.002 | <0.0005 | <0.0005 | <0.0005 | <0.0005 | <0.0005 |
| 12 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 13 | 0.0005 | 3.3 | 0.077 | 0.001 | <0.0005 | <0.0015 | 0.003 | 0.001 | <0.0005 | <0.0005 | <0.0005 | <0.0005 | <0.0005 |
| 14 | 0.0005 | 3.3 | 0.079 | 0.001 | <0.0005 | <0.0015 | 0.002 | 0.001 | <0.0005 | <0.0005 | <0.0005 | <0.0005 | <0.0005 |
| 15 | 0.0005 | 3.3 | 0.077 | 0.001 | <0.0005 | <0.0015 | 0.003 | 0.001 | <0.0005 | <0.0005 | <0.0005 | <0.0005 | <0.0005 |
| 16 | 0.0005 | 3.3 | 0.079 | 0.001 | <0.0005 | <0.0015 | 0.002 | 0.001 | <0.0005 | <0.0005 | <0.0005 | <0.0005 | <0.0005 |
| 17 | 0.0005 | 3.3 | 0.076 | 0.001 | <0.0005 | <0.0015 | 0.002 | 0.002 | <0.0005 | <0.0005 | <0.0005 | <0.0005 | <0.0005 |
| 18 | 0.0005 | 3.3 | 0.079 | 0.001 | <0.0005 | <0.0015 | 0.003 | 0.002 | <0.0005 | <0.0005 | <0.0005 | <0.0005 | <0.0005 |
| 19 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 20 | 0.0005 | 3.3 | 0.079 | 0.001 | <0.0005 | <0.0015 | 0.003 | 0.001 | <0.0005 | <0.0005 | <0.0005 | <0.0005 | <0.0005 |
| 21 | 0.0005 | 3.3 | 0.080 | 0.001 | <0.0005 | <0.0015 | 0.002 | 0.002 | <0.0005 | <0.0005 | <0.0005 | <0.0005 | <0.0005 |
| 22 | 0.0005 | 3.3 | 0.079 | 0.001 | <0.0005 | <0.0015 | 0.002 | 0.001 | <0.0005 | <0.0005 | <0.0005 | <0.0005 | <0.0005 |
| 23 | 0.0005 | 3.3 | 0.079 | 0.001 | <0.0005 | <0.0015 | 0.003 | 0.002 | <0.0005 | <0.0005 | <0.0005 | <0.0005 | <0.0005 |
| 24 | 0.0005 | 3.3 | 0.079 | 0.001 | <0.0005 | <0.0015 | 0.002 | 0.002 | <0.0005 | <0.0005 | <0.0005 | <0.0005 | <0.0005 |
| 25 | 0.0005 | 3.3 | 0.079 | 0.001 | <0.0005 | <0.0015 | 0.002 | 0.003 | <0.0005 | <0.0005 | <0.0005 | <0.0005 | <0.0005 |
| 26 | 0.0005 | 3.3 | 0.079 | 0.001 | <0.0005 | <0.0015 | 0.002 | 0.002 | <0.0005 | <0.0005 | <0.0005 | <0.0005 | <0.0005 |
| 27 | 0.0005 | 3.3 | 0.079 | 0.001 | <0.0005 | <0.0015 | 0.002 | 0.002 | <0.0005 | <0.0005 | <0.0005 | <0.0005 | <0.0005 |
| 28 | 0.0005 | 3.3 | 0.079 | 0.001 | <0.0005 | <0.0015 | 0.002 | 0.003 | <0.0005 | <0.0005 | <0.0005 | <0.0005 | <0.0005 |
| 29 | 0.0005 | 3.3 | 0.075 | 0.001 | <0.0005 | <0.0015 | 0.003 | 0.001 | <0.0005 | <0.0005 | <0.0005 | <0.0005 | <0.0005 |
| 30 | 0.0005 | 3.3 | 0.076 | 0.001 | <0.0005 | <0.0015 | 0.002 | 0.001 | <0.0005 | <0.0005 | <0.0005 | <0.0005 | <0.0005 |
| 31 | 0.0005 | 3.3 | 0.074 | 0.001 | <0.0005 | <0.0015 | 0.003 | 0.002 | <0.0005 | <0.0005 | <0.0005 | <0.0005 | <0.0005 |
| 32 | 0.0005 | 3.3 | 0.073 | 0.001 | <0.0005 | <0.0015 | 0.003 | 0.001 | <0.0005 | <0.0005 | <0.0005 | <0.0005 | <0.0005 |
| 33 | 0.0005 | 3.3 | 0.077 | 0.001 | <0.0005 | <0.0015 | 0.003 | 0.001 | <0.0005 | <0.0005 | <0.0005 | <0.0005 | <0.0005 |
| 34 | 0.0005 | 3.3 | 0.076 | 0.001 | <0.0005 | <0.0015 | 0.002 | 0.002 | <0.0005 | <0.0005 | <0.0005 | <0.0005 | <0.0005 |
| 35 | 0.0005 | 3.3 | 0.077 | 0.001 | <0.0005 | <0.0015 | 0.002 | 0.002 | <0.0005 | <0.0005 | <0.0005 | <0.0005 | <0.0005 |
| 36 | 0.0005 | 3.3 | 0.080 | 0.001 | <0.0005 | <0.0015 | 0.002 | 0.002 | <0.0005 | <0.0005 | <0.0005 | <0.0005 | <0.0005 |
| 37 | 0.0005 | 3.3 | 0.080 | 0.001 | <0.0005 | <0.0015 | 0.003 | 0.002 | <0.0005 | <0.0005 | <0.0005 | <0.0005 | <0.0005 |
| 38 | 0.0005 | 3.3 | 0.080 | 0.001 | <0.0005 | <0.0015 | 0.002 | 0.002 | <0.0005 | <0.0005 | <0.0005 | <0.0005 | <0.0005 |
| 39 | 0.0005 | 3.3 | 0.080 | <0.0005 | 0.001 | <0.0015 | 0.002 | 0.002 | <0.0005 | <0.0005 | <0.0005 | <0.0005 | <0.0005 |
| 40 | 0.0005 | 3.3 | 0.081 | <0.0005 | 0.001 | <0.0015 | 0.002 | 0.001 | <0.0005 | <0.0005 | <0.0005 | <0.0005 | <0.0005 |
| 41 | 0.0005 | 3.3 | 0.081 | <0.0005 | 0.001 | <0.0015 | 0.004 | 0.001 | <0.0005 | <0.0005 | <0.0005 | <0.0005 | <0.0005 |
| 42 | 0.0005 | 3.3 | 0.082 | <0.0005 | 0.001 | <0.0015 | 0.002 | 0.002 | <0.0005 | <0.0005 | <0.0005 | <0.0005 | <0.0005 |
| 43 | 0.0005 | 3.3 | 0.080 | <0.0005 | 0.001 | <0.0015 | 0.001 | 0.001 | <0.0005 | <0.0005 | <0.0005 | <0.0005 | <0.0005 |
| 44 | 0.0005 | 3.3 | 0.081 | <0.0005 | 0.001 | <0.0015 | 0.002 | 0.003 | <0.0005 | <0.0005 | <0.0005 | <0.0005 | <0.0005 |
| 45 | 0.0005 | 3.3 | 0.080 | <0.0005 | 0.001 | <0.0015 | 0.003 | 0.001 | <0.0005 | <0.0005 | <0.0005 | <0.0005 | <0.0005 |
| 46 | 0.0005 | 3.3 | 0.080 | <0.0005 | 0.001 | <0.0015 | 0.002 | 0.002 | <0.0005 | <0.0005 | <0.0005 | <0.0005 | <0.0005 |
| 47 | 0.0005 | 3.3 | 0.079 | <0.0005 | 0.001 | <0.0015 | 0.002 | 0.001 | <0.0005 | <0.0005 | <0.0005 | <0.0005 | <0.0005 |
| 48 | 0.0005 | 3.3 | 0.080 | <0.0005 | 0.001 | <0.0015 | 0.002 | 0.001 | <0.0005 | <0.0005 | <0.0005 | <0.0005 | <0.0005 |
| 49 | 0.0005 | 3.3 | 0.080 | <0.0005 | 0.001 | <0.0015 | 0.002 | 0.001 | <0.0005 | <0.0005 | <0.0005 | <0.0005 | <0.0005 |
| 50 | 0.0005 | 3.3 | 0.081 | <0.0005 | 0.001 | <0.0015 | 0.003 | 0.002 | <0.0005 | <0.0005 | <0.0005 | <0.0005 | <0.0005 |
| 51 | 0.0005 | 3.3 | 0.077 | 0.001 | 0.001 | 0.002 | 0.002 | 0.001 | 0.0200 | <0.0005 | <0.0005 | <0.0005 | <0.0005 |
| 52 | 0.0005 | 3.3 | 0.080 | 0.001 | 0.001 | 0.002 | 0.002 | 0.001 | <0.0005 | 0.0010 | <0.0005 | <0.0005 | <0.0005 |

TABLE 4-continued

| Test no. | Chemical composition (unit: mass %, balance of Fe and impurities) | | | | | | | | | | | | |
|---|---|---|---|---|---|---|---|---|---|---|---|---|---|
| | C | Si | Mn | S | Se | S + Se | Sol. Al | N | Sn | Sb | Bi | Te | Pb |
| 53 | 0.0005 | 3.3 | 0.079 | 0.001 | 0.001 | 0.002 | 0.002 | 0.001 | <0.0005 | <0.0005 | 0.0008 | <0.0005 | <0.0005 |
| 54 | 0.0005 | 3.3 | 0.081 | 0.001 | 0.001 | 0.002 | 0.003 | 0.001 | <0.0005 | <0.0005 | <0.0005 | 0.0005 | <0.0005 |
| 55 | 0.0005 | 3.3 | 0.080 | 0.001 | 0.001 | 0.002 | 0.003 | 0.003 | <0.0005 | <0.0005 | <0.0005 | <0.0005 | 0.0005 |
| 56 | 0.0005 | 3.3 | 0.080 | <0.0005 | 0.001 | <0.0015 | 0.003 | 0.002 | <0.0005 | <0.0005 | <0.0005 | <0.0005 | <0.0005 |
| 57 | 0.0005 | 3.3 | 0.080 | 0.001 | <0.0005 | <0.0015 | 0.003 | 0.001 | <0.0005 | <0.0005 | <0.0005 | <0.0005 | <0.0005 |
| 58 | 0.0005 | 3.3 | 0.077 | 0.001 | <0.0005 | <0.0015 | 0.002 | 0.001 | <0.0005 | <0.0005 | <0.0005 | <0.0005 | <0.0005 |
| 59 | 0.0005 | 3.3 | 0.076 | 0.001 | <0.0005 | <0.0015 | 0.002 | 0.002 | <0.0005 | <0.0005 | <0.0005 | <0.0005 | <0.0005 |
| 60 | 0.0005 | 3.3 | 0.079 | <0.0005 | 0.001 | <0.0015 | 0.003 | 0.002 | <0.0005 | <0.0005 | <0.0005 | <0.0005 | <0.0005 |
| 61 | 0.0005 | 3.3 | 0.077 | <0.0005 | 0.001 | <0.0015 | 0.002 | 0.002 | <0.0005 | <0.0005 | <0.0005 | <0.0005 | <0.0005 |
| 62 | 0.0005 | 3.3 | 0.077 | <0.0005 | 0.001 | <0.0015 | 0.003 | 0.002 | <0.0005 | <0.0005 | <0.0005 | <0.0005 | <0.0005 |
| 63 | 0.0005 | 3.3 | 0.080 | <0.0005 | 0.001 | <0.0015 | 0.003 | 0.001 | <0.0005 | <0.0005 | <0.0005 | <0.0005 | <0.0005 |
| 64 | 0.0005 | 3.3 | 0.077 | <0.0005 | 0.001 | <0.0015 | 0.002 | 0.001 | <0.0005 | <0.0005 | <0.0005 | <0.0005 | <0.0005 |
| 65 | 0.0005 | 3.3 | 0.077 | <0.0005 | 0.001 | <0.0015 | 0.002 | 0.001 | <0.0005 | <0.0005 | <0.0005 | <0.0005 | <0.0005 |
| 66 | 0.0005 | 3.3 | 0.078 | <0.0005 | 0.001 | <0.0015 | 0.002 | 0.002 | <0.0005 | <0.0005 | <0.0005 | <0.0005 | <0.0005 |
| 67 | 0.0005 | 3.3 | 0.077 | <0.0005 | 0.001 | <0.0015 | 0.002 | 0.001 | <0.0005 | <0.0005 | <0.0005 | <0.0005 | <0.0005 |
| 68 | 0.0005 | 3.3 | 0.080 | <0.0005 | 0.001 | <0.0015 | 0.002 | 0.001 | <0.0005 | <0.0005 | <0.0005 | <0.0005 | <0.0005 |
| 69 | 0.0005 | 3.3 | 0.078 | <0.0005 | 0.001 | <0.0015 | 0.001 | 0.002 | <0.0005 | <0.0005 | <0.0005 | <0.0005 | <0.0005 |
| 70 | 0.0005 | 3.3 | 0.079 | <0.0005 | 0.001 | <0.0015 | 0.003 | 0.001 | <0.0005 | <0.0005 | <0.0005 | <0.0005 | <0.0005 |
| 71 | 0.0005 | 3.3 | 0.076 | <0.0005 | 0.001 | <0.0015 | 0.003 | 0.002 | <0.0005 | <0.0005 | <0.0005 | <0.0005 | <0.0005 |
| 72 | 0.0005 | 3.3 | 0.076 | <0.0005 | 0.001 | <0.0015 | 0.003 | 0.001 | <0.0005 | <0.0005 | <0.0005 | <0.0005 | <0.0005 |
| 73 | 0.0005 | 3.3 | 0.080 | <0.0005 | 0.001 | <0.0015 | 0.002 | 0.003 | <0.0005 | <0.0005 | <0.0005 | <0.0005 | <0.0005 |
| 74 | 0.0005 | 3.3 | 0.078 | <0.0005 | 0.001 | <0.0015 | 0.003 | 0.003 | <0.0005 | <0.0005 | <0.0005 | <0.0005 | <0.0005 |
| 75 | 0.0005 | 3.3 | 0.077 | <0.0005 | 0.001 | <0.0015 | 0.002 | 0.001 | <0.0005 | <0.0005 | <0.0005 | <0.0005 | <0.0005 |
| 76 | 0.0005 | 3.3 | 0.079 | <0.0005 | 0.001 | <0.0015 | 0.002 | 0.001 | <0.0005 | <0.0005 | <0.0005 | <0.0005 | <0.0005 |
| 77 | 0.0005 | 3.3 | 0.080 | <0.0005 | 0.001 | <0.0015 | 0.002 | 0.001 | <0.0005 | <0.0005 | <0.0005 | <0.0005 | <0.0005 |
| 78 | 0.0005 | 3.3 | 0.080 | <0.0005 | 0.001 | <0.0015 | 0.002 | 0.001 | <0.0005 | <0.0005 | <0.0005 | <0.0005 | <0.0005 |
| 79 | 0.0005 | 3.3 | 0.079 | <0.0005 | 0.001 | <0.0015 | 0.003 | 0.001 | <0.0005 | <0.0005 | <0.0005 | <0.0005 | <0.0005 |
| 80 | 0.0005 | 3.3 | 0.079 | <0.0005 | 0.001 | <0.0015 | 0.002 | 0.001 | <0.0005 | <0.0005 | <0.0005 | <0.0005 | <0.0005 |
| 81 | 0.0005 | 3.3 | 0.079 | <0.0005 | 0.001 | <0.0015 | 0.002 | 0.001 | <0.0005 | <0.0005 | <0.0005 | <0.0005 | <0.0005 |
| 82 | 0.0005 | 3.3 | 0.076 | <0.0005 | 0.001 | <0.0015 | 0.003 | 0.001 | <0.0005 | <0.0005 | <0.0005 | <0.0005 | <0.0005 |

TABLE 5

| Test no. | Chemical composition (unit: mass %, balance of Fe and impurities) | | | | | | | | | | | | |
|---|---|---|---|---|---|---|---|---|---|---|---|---|---|
| | C | Si | Mn | S | Se | S + Se | Sol. Al | N | Sn | Sb | Bi | Te | Pb |
| 83 | A | 3.3 | 0.077 | 0.001 | <0.0005 | <0.0015 | 0.002 | 0.001 | <0.0005 | <0.0005 | <0.0005 | <0.0005 | <0.0005 |
| 84 | A | 3.3 | 0.077 | 0.001 | <0.0005 | <0.0015 | 0.002 | 0.002 | <0.0005 | <0.0005 | <0.0005 | <0.0005 | <0.0005 |
| 85 | B | 3.3 | 0.078 | <0.0005 | 0.001 | <0.0015 | 0.002 | 0.002 | <0.0005 | <0.0005 | <0.0005 | <0.0005 | <0.0005 |
| 86 | B | 3.3 | 0.077 | <0.0005 | 0.001 | <0.0015 | 0.003 | 0.002 | <0.0005 | <0.0005 | <0.0005 | <0.0005 | <0.0005 |
| 87 | A | 3.3 | 0.076 | 0.001 | <0.0005 | <0.0015 | 0.002 | 0.002 | <0.0005 | <0.0005 | <0.0005 | <0.0005 | <0.0005 |
| 88 | B | 3.3 | 0.078 | <0.0005 | 0.001 | <0.0015 | 0.002 | 0.002 | <0.0005 | <0.0005 | <0.0005 | <0.0005 | <0.0005 |
| 89 | A | 3.3 | 0.077 | 0.001 | <0.0005 | <0.0015 | 0.002 | 0.001 | <0.0005 | <0.0005 | <0.0005 | <0.0005 | <0.0005 |
| 90 | A | 3.3 | 0.076 | 0.001 | <0.0005 | <0.0015 | 0.002 | 0.002 | <0.0005 | <0.0005 | <0.0005 | <0.0005 | <0.0005 |
| 91 | B | 3.3 | 0.078 | <0.0005 | 0.001 | <0.0015 | 0.003 | 0.001 | <0.0005 | <0.0005 | <0.0005 | <0.0005 | <0.0005 |
| 92 | B | 3.3 | 0.077 | <0.0005 | 0.001 | <0.0015 | 0.002 | 0.002 | <0.0005 | <0.0005 | <0.0005 | <0.0005 | <0.0005 |
| 93 | A | 3.3 | 0.077 | 0.001 | <0.0005 | <0.0015 | 0.003 | 0.002 | <0.0005 | <0.0005 | <0.0005 | <0.0005 | <0.0005 |
| 94 | B | 3.3 | 0.079 | <0.0005 | 0.001 | <0.0015 | 0.002 | 0.002 | <0.0005 | <0.0005 | <0.0005 | <0.0005 | <0.0005 |
| 95 | A | 3.3 | 0.076 | 0.001 | <0.0005 | <0.0015 | 0.002 | 0.001 | <0.0005 | <0.0005 | <0.0005 | <0.0005 | <0.0005 |
| 96 | A | 3.3 | 0.076 | 0.001 | <0.0005 | <0.0015 | 0.002 | 0.002 | <0.0005 | <0.0005 | <0.0005 | <0.0005 | <0.0005 |
| 97 | B | 3.3 | 0.079 | <0.0005 | 0.001 | <0.0015 | 0.003 | 0.002 | <0.0005 | <0.0005 | <0.0005 | <0.0005 | <0.0005 |
| 98 | B | 3.3 | 0.076 | <0.0005 | 0.001 | <0.0015 | 0.002 | 0.002 | <0.0005 | <0.0005 | <0.0005 | <0.0005 | <0.0005 |
| 99 | A | 3.3 | 0.076 | 0.001 | <0.0005 | <0.0015 | 0.002 | 0.002 | <0.0005 | <0.0005 | <0.0005 | <0.0005 | <0.0005 |
| 100 | B | 3.3 | 0.079 | <0.0005 | 0.001 | <0.0015 | 0.003 | 0.002 | <0.0005 | <0.0005 | <0.0005 | <0.0005 | <0.0005 |

Evaluation Tests

Al Peak Position $D_{Al}$ Measurement Test

For each of the grain-oriented electrical steel sheet of the numbered tests, the following measurement method was used to find the Al peak position $D_{Al}$. Specifically, the surface layer of the grain-oriented electrical steel sheet was examined by elemental analysis using the GDS method. The elemental analysis was conducted in a range of 100 μm in the depth direction from the surface of the grain-oriented electrical steel sheet (in the surface layer). The Al contained at different depth positions in the surface layer was identified. The emission intensity of the identified Al was plotted in the depth direction from the surface. Based on the graph of the Al emission intensity plotted, the Al peak position $D_{Al}$ was found. The found Al peak position $D_{Al}$ is shown in Table 6 and Table 7.

TABLE 6

| New test no. | Hot rolled steel sheet steel type | Y, La, Ce content $C_{RE}$ (mass %) | Ti, Zr, Hf content $C_{G4}$ (mass %) | Total content $C_{RE} + C_{G4}$ (mass %) | Ca, Sr, Ba content $C_{AE}$ (mass %) | $PS_{RE}$ | Mean particle size $PS_{AE}$ (μm) | $RA_{AE/RE}$ | $X_{RE}/X_{G4}$ | Raw material powder Y, La, Ce number density $N_{RE}$ (100,000,000/g) |
|---|---|---|---|---|---|---|---|---|---|---|
| 1 | A | 0.00 | 0.00 | 0.00 | 0.00 | — | — | — | — | — |
| 2 | A | 0.50 | 0.20 | 0.70 | 0.30 | 5.60 | 8.40 | 1.50 | 1.77 | 51.5 |
| 3 | A | 0.00 | 0.75 | 0.75 | 0.15 | — | 8.40 | — | 0.00 | — |
| 4 | A | 0.00 | 0.90 | 0.90 | 0.15 | — | 8.40 | — | 0.00 | — |
| 5 | A | 0.00 | 1.20 | 1.20 | 0.15 | — | 8.40 | — | 0.00 | — |
| 6 | A | 0.00 | 0.00 | 0.00 | 0.15 | — | 8.40 | — | — | — |
| 7 | A | 0.00 | 0.00 | 0.00 | 0.15 | — | 9.40 | — | — | — |
| 8 | A | 0.00 | 0.00 | 0.00 | 0.15 | — | 10.40 | — | — | — |
| 9 | A | 0.00 | 0.75 | 0.75 | 8.50 | — | 8.40 | — | 0.00 | — |
| 10 | A | 0.00 | 0.78 | 0.78 | 1.20 | — | 13.00 | — | 0.00 | — |
| 11 | A | 0.25 | 0.85 | 1.10 | 1.20 | 5.60 | 8.40 | 1.50 | 0.55 | 51.5 |
| 12 | A | 0.30 | 0.70 | 1.00 | 0.15 | 5.60 | 8.40 | 1.50 | 0.21 | 51.5 |
| 13 | A | 0.45 | 0.75 | 1.20 | 0.20 | 5.60 | 8.40 | 1.50 | 0.43 | 51.5 |
| 14 | A | 0.25 | 0.70 | 0.95 | 0.30 | 5.60 | 8.40 | 1.50 | 0.34 | 51.5 |
| 15 | A | 0.25 | 0.70 | 0.95 | 8.50 | 5.60 | 8.40 | 1.50 | 0.19 | 51.5 |
| 16 | A | 0.25 | 1.00 | 1.25 | 1.20 | 5.60 | 13.00 | 2.32 | 0.47 | 51.5 |
| 17 | A | 0.25 | 2.50 | 2.75 | 1.50 | 2.63 | 8.40 | 3.20 | 0.06 | 182.0 |
| 18 | A | 0.25 | 0.70 | 0.95 | 1.20 | 21.00 | 8.40 | 0.40 | 0.25 | 21.2 |
| 19 | A | 0.55 | 0.50 | 1.05 | 3.40 | 5.60 | 8.40 | 1.50 | 0.63 | 62.2 |
| 20 | A | 0.85 | 0.00 | 0.85 | 1.20 | 5.60 | 8.40 | 1.50 | — | 62.2 |
| 21 | A | 0.00 | 1.00 | 1.00 | 0.00 | — | — | — | 0.00 | — |
| 22 | A | 0.40 | 0.55 | 0.95 | 1.20 | 5.60 | 8.40 | 1.50 | 0.40 | 62.2 |
| 23 | A | 0.85 | 0.50 | 1.35 | 0.00 | 5.60 | — | — | 1.20 | 62.2 |
| 24 | A | 0.85 | 0.50 | 1.35 | 0.15 | 5.60 | 8.40 | 1.50 | 0.79 | 62.2 |
| 25 | A | 0.90 | 1.30 | 2.20 | 0.80 | 5.60 | 8.40 | 1.50 | 0.49 | 51.5 |
| 26 | A | 0.90 | 1.50 | 2.40 | 1.20 | 5.60 | 8.40 | 1.50 | 0.37 | 62.2 |
| 27 | A | 1.00 | 1.50 | 2.50 | 3.60 | 5.60 | 8.40 | 1.50 | 0.66 | 103.5 |
| 28 | A | 0.85 | 0.50 | 1.35 | 8.50 | 5.60 | 8.40 | 1.50 | 1.20 | 62.2 |
| 29 | A | 0.85 | 0.50 | 1.35 | 1.20 | 5.60 | 13.00 | 2.32 | 2.20 | 62.2 |
| 30 | A | 0.85 | 0.50 | 1.35 | 1.20 | 2.63 | 8.40 | 3.20 | 0.79 | 193.8 |
| 31 | A | 1.50 | 0.50 | 2.00 | 1.20 | 9.80 | 0.80 | 0.08 | 2.15 | 22.5 |
| 32 | A | 1.70 | 0.20 | 1.90 | 1.25 | 5.60 | 8.40 | 1.50 | 5.40 | 103.5 |
| 33 | A | 0.00 | 4.00 | 4.00 | 1.80 | — | 8.40 | — | 0.00 | — |
| 34 | A | 0.40 | 4.00 | 4.40 | 2.40 | 5.60 | 8.40 | 1.50 | 0.07 | 62.2 |
| 35 | A | 2.00 | 2.00 | 4.00 | 1.50 | 5.60 | 8.40 | 1.50 | 1.09 | 62.2 |
| 36 | A | 3.00 | 1.00 | 4.00 | 1.50 | 5.60 | 8.40 | 1.50 | 2.27 | 62.2 |
| 37 | A | 4.00 | 0.00 | 4.00 | 1.20 | 5.60 | 8.40 | 1.50 | — | 62.2 |
| 38 | A | 0.00 | 6.00 | 6.00 | 1.20 | — | 8.40 | — | 0.00 | — |
| 39 | B | 0.50 | 9.50 | 10.00 | 1.20 | 5.60 | 8.40 | 1.50 | 0.06 | 28.2 |
| 40 | B | 3.00 | 3.00 | 6.00 | 1.50 | 5.60 | 8.40 | 1.50 | 1.22 | 28.2 |
| 41 | B | 5.20 | 0.50 | 5.70 | 1.50 | 5.60 | 8.40 | 1.50 | 5.10 | 28.2 |
| 42 | B | 6.00 | 0.00 | 6.00 | 1.80 | 5.60 | 8.40 | 1.50 | — | 28.2 |
| 43 | B | 6.00 | 2.10 | 8.10 | 1.80 | 5.60 | 8.40 | 1.50 | 3.86 | 28.2 |
| 44 | B | 6.00 | 2.00 | 8.00 | 1.80 | 5.60 | 8.40 | 1.50 | 2.12 | 28.2 |
| 45 | B | 7.00 | 6.00 | 13.00 | 1.20 | 5.60 | 8.40 | 1.50 | 1.51 | 28.2 |
| 46 | B | 8.50 | 2.50 | 11.00 | 2.50 | 5.60 | 8.40 | 1.50 | 2.57 | 28.2 |
| 47 | B | 4.50 | 11.00 | 15.50 | 1.20 | 5.60 | 8.40 | 1.50 | 0.40 | 28.2 |
| 48 | B | 1.20 | 0.20 | 1.40 | 1.20 | 5.60 | 8.40 | 1.50 | 4.24 | 28.2 |
| 49 | B | 1.40 | 6.00 | 7.40 | 1.50 | 5.60 | 8.40 | 1.50 | 0.13 | 28.2 |
| 50 | B | 0.50 | 0.25 | 0.75 | 2.00 | 5.60 | 8.40 | 1.50 | 1.41 | 28.2 |

| New test no. | Raw material powder Ti, Zr, Hf number density $N_{G4}$ (100,000,000/g) | Raw material powder Ca, Sr, Ba number density $N_{AE}$ (100,000,000/g) | Primary coating $D_{Al}$ (μm) | ND (/μm²) | $RA_{area}$ (%) | Magnetism | Adhesion | Rust resistance | Remarks |
|---|---|---|---|---|---|---|---|---|---|
| 1 | — | — | 1.4 | 0.022 | 48 | 1.946 | 45 | Poor | Comp. ex. |
| 2 | 49.8 | 42.2 | 2.1 | 0.022 | 52 | 1.946 | 49 | Poor | Comp. ex. |
| 3 | 49.8 | 42.2 | 1.4 | 0.027 | 59 | 1.946 | 48 | Poor | Comp. ex. |
| 4 | 35.4 | 42.2 | 1.4 | 0.025 | 59 | 1.946 | 48 | Poor | Comp. ex. |
| 5 | 72.1 | 42.2 | 1.4 | 0.027 | 59 | 1.946 | 48 | Poor | Comp. ex. |
| 6 | — | 42.2 | 1.8 | 0.026 | 59 | 1.946 | 48 | Poor | Comp. ex. |
| 7 | — | 51.5 | 1.8 | 0.026 | 59 | 1.946 | 48 | Poor | Comp. ex. |
| 8 | — | 41.8 | 1.8 | 0.026 | 59 | 1.946 | 18 | Poor | Comp. ex. |
| 9 | 49.8 | 62.1 | 1.4 | 0.022 | 59 | 1.946 | 48 | Poor | Comp. ex. |
| 10 | 35.4 | 54.5 | 1.6 | 0.027 | 59 | 1.946 | 48 | Poor | Comp. ex. |

TABLE 6-continued

| | | | | | | | | | |
|---|---|---|---|---|---|---|---|---|---|
| | 11 | 72.1 | 34.4 | 1.8 | 0.026 | 72 | 1.952 | 62 | Fair | Comp. ex. |
| | 12 | 49.8 | 38.2 | 1.7 | 0.018 | 59 | 1.946 | 72 | Poor | Comp. ex. |
| | 13 | 35.4 | 39.1 | 1.7 | 0.018 | 59 | 1.946 | 72 | Poor | Comp. ex. |
| | 14 | 68.1 | 64.4 | 1.7 | 0.018 | 59 | 1.946 | 72 | Poor | Comp. ex. |
| | 15 | 42.2 | 72.5 | 1.8 | 0.024 | 59 | 1.946 | 71 | Poor | Comp. ex. |
| | 16 | 72.1 | 21.8 | 1.6 | 0.026 | 59 | 1.946 | 78 | Poor | Comp. ex. |
| | 17 | 43.5 | 42.1 | 1.6 | 0.024 | 59 | 1.946 | 71 | Poor | Comp. ex. |
| | 18 | 49.8 | 29.9 | 1.6 | 0.021 | 59 | 1.941 | 66 | Poor | Comp. ex. |
| | 19 | 49.8 | 35.5 | 2.1 | 0.018 | 71 | 1.950 | 69 | Fair | Comp. ex. |
| | 20 | — | 42.5 | 1.6 | 0.022 | 74 | 1.942 | 48 | Fair | Comp. ex. |
| | 21 | 49.8 | — | 1.3 | 0.019 | 72 | 1.958 | 68 | Poor | Comp. ex. |
| | 22 | 49.8 | 45.3 | 1.9 | 0.029 | 74 | 1.959 | 72 | Fair | Comp. ex. |
| | 23 | 49.8 | — | 1.9 | 0.022 | 73 | 1.946 | 91 | Fair | Comp. ex. |
| | 24 | 49.8 | 77.1 | 1.9 | 0.028 | 72 | 1.946 | 92 | Fair | Comp. ex. |
| | 25 | 49.8 | 76.9 | 2.5 | 0.035 | 77 | 1.946 | 92 | Good | Inv. ex. |
| | 26 | 61.5 | 64.8 | 2.5 | 0.036 | 78 | 1.946 | 93 | Good | Inv. ex. |
| | 27 | 59.5 | 62.2 | 2.4 | 0.034 | 78 | 1.946 | 93 | Good | Inv. ex. |
| | 28 | 49.8 | 42.8 | 2.1 | 0.022 | 71 | 1.946 | 88 | Fair | Comp. ex. |
| | 29 | 72.1 | 63.5 | 1.9 | 0.029 | 72 | 1.946 | 68 | Fair | Comp. ex. |
| | 30 | 49.8 | 54.2 | 1.8 | 0.028 | 68 | 1.946 | 72 | Fair | Comp. ex. |
| | 31 | 35.4 | 19883.2 | 2.1 | 0.032 | 59 | 1.923 | 91 | Poor | Comp. ex. |
| | 32 | 49.8 | 72.8 | 1.9 | 0.017 | 71 | 1.945 | 77 | Fair | Comp. ex. |
| | 33 | 35.4 | 96.6 | 1.3 | 0.028 | 58 | 1.958 | 67 | Poor | Comp. ex. |
| | 34 | 49.8 | 45.5 | 1.9 | 0.022 | 69 | 1.946 | 62 | Fair | Comp. ex. |
| | 35 | 35.4 | 51.1 | 3.2 | 0.077 | 79 | 1.948 | 91 | Good | Inv. ex. |
| | 36 | 35.4 | 51.1 | 4.2 | 0.051 | 81 | 1.957 | 91 | Good | Inv. ex. |
| | 37 | — | 63.2 | 5.6 | 0.028 | 75 | 1.922 | 71 | Good | Comp. ex. |
| | 38 | 49.8 | 63.2 | 1.2 | 0.035 | 70 | 1.955 | 68 | Fair | Comp. ex. |
| | 39 | 62.4 | 63.2 | 1.9 | 0.195 | 68 | 1.921 | 75 | Fair | Comp. ex. |
| | 40 | 72.1 | 51.1 | 4.3 | 0.088 | 79 | 1.921 | 94 | Good | Inv. ex. |
| | 41 | 49.8 | 51.1 | 6.0 | 0.029 | 86 | 1.943 | 82 | Good | Comp. ex. |
| | 42 | — | 96.6 | 7.2 | 0.006 | 76 | 1.949 | 81 | Good | Comp. ex. |
| | 43 | 72.1 | 96.6 | 6.8 | 0.122 | 85 | 1.924 | 91 | Good | Inv. ex. |
| | 44 | 49.8 | 96.6 | 8.2 | 0.131 | 84 | 1.943 | 92 | Good | Inv. ex. |
| | 45 | 72.1 | 63.2 | 11.5 | 0.190 | 73 | 1.922 | 91 | Fair | Comp. ex. |
| | 46 | 35.4 | 51.1 | 12.1 | 0.149 | 78 | 1.877 | 92 | Good | Comp. ex. |
| | 47 | 42.5 | 63.2 | 8.8 | 0.235 | 72 | 1.859 | 95 | Fair | Comp. ex. |
| | 48 | 49.8 | 63.2 | 1.9 | 0.027 | 69 | 1.937 | 83 | Fair | Comp. ex. |
| | 49 | 42.1 | 96.6 | 2.4 | 0.038 | 72 | 1.944 | 92 | Fair | Comp. ex. |
| | 50 | 49.8 | 51.1 | 1.9 | 0.021 | 76 | 1.956 | 60 | Good | Comp. ex. |

TABLE 7

| New test no. | Hot rolled steel sheet steel type | Additives in annealing separator | | | | | | | Raw material powder Y, La, Ce |
|---|---|---|---|---|---|---|---|---|---|
| | | Y, La, Ce content $C_{RE}$ (mass %) | Ti, Zr, Hf content $C_{G4}$ (mass %) | Total content $C_{RE} + C_{G4}$ (mass %) | Ca, Sr, Ba content $C_{AE}$ (mass %) | $PS_{RE}$ | Mean particle size $PS_{AE}$ (μm) | $RA_{AE/RE}$ $X_{RE}/X_{G4}$ | number density $N_{RE}$ (100,000,000/g) |
| 51 | C | 1.80 | 1.40 | 3.20 | 1.80 | 5.60 | 8.40 | 1.50 0.72 | 28.2 |
| 52 | D | 1.50 | 1.40 | 2.90 | 1.20 | 5.60 | 8.40 | 1.50 0.64 | 51.5 |
| 53 | E | 2.00 | 2.00 | 4.00 | 1.50 | 5.60 | 8.40 | 1.50 1.38 | 62.2 |
| 54 | F | 1.40 | 1.50 | 2.90 | 1.80 | 5.60 | 8.40 | 1.50 0.78 | 108.2 |
| 55 | G | 1.80 | 4.50 | 6.30 | 1.20 | 5.60 | 8.40 | 1.50 0.36 | 304.5 |
| 56 | B | 3.50 | 2.50 | 6.00 | 1.20 | 0.73 | 3.29 | 4.50 0.86 | 9821.2 |
| 57 | A | 3.50 | 2.50 | 6.00 | 0.00 | 5.60 | — | — 1.53 | 28.2 |
| 58 | A | 3.50 | 2.50 | 6.00 | 0.15 | 5.60 | 8.40 | 1.50 2.61 | 32.0 |
| 59 | A | 3.50 | 2.50 | 6.00 | 1.20 | 1.63 | 2.45 | 1.50 1.71 | 829.4 |
| 60 | B | 3.50 | 2.50 | 6.00 | 3.50 | 5.60 | 8.40 | 1.50 1.00 | 32.0 |
| 61 | B | 3.50 | 2.50 | 6.00 | 9.20 | 5.60 | 8.40 | 1.50 1.71 | 32.0 |
| 62 | B | 3.50 | 2.50 | 6.00 | 1.20 | 5.60 | 13.00 | 2.32 1.81 | 32.0 |
| 63 | B | 3.50 | 5.00 | 8.50 | 1.20 | 2.63 | 8.40 | 3.20 0.50 | 405.8 |
| 64 | B | 3.50 | 5.00 | 8.50 | 1.50 | 4.20 | 0.38 | 0.09 0.76 | 58.6 |
| 65 | B | 3.50 | 2.50 | 6.00 | 2.00 | 1.09 | 0.10 | 0.09 0.69 | 3255.4 |
| 66 | B | 3.50 | 2.50 | 6.00 | 1.50 | 2.23 | 0.13 | 0.06 0.65 | 351.2 |
| 67 | B | 3.50 | 4.00 | 7.50 | 2.00 | 2.58 | 0.24 | 0.09 0.65 | 281.6 |
| 68 | B | 3.50 | 4.00 | 7.50 | 1.50 | 3.77 | 0.20 | 0.05 0.81 | 244.4 |
| 69 | B | 3.50 | 2.50 | 6.00 | 1.20 | 1.66 | 4.83 | 2.90 2.15 | 914.5 |
| 70 | B | 3.50 | 2.50 | 6.00 | 2.70 | 3.24 | 4.86 | 1.50 0.65 | 351.9 |
| 71 | B | 3.50 | 2.50 | 6.00 | 2.00 | 2.15 | 0.19 | 0.09 1.33 | 482.1 |
| 72 | B | 3.50 | 2.00 | 5.50 | 3.00 | 4.41 | 0.27 | 0.06 2.78 | 82.6 |
| 73 | B | 3.50 | 2.50 | 6.00 | 3.00 | 5.13 | 0.42 | 0.08 1.75 | 40.6 |
| 74 | B | 3.50 | 3.00 | 6.50 | 3.00 | 14.92 | 1.20 | 0.08 1.47 | 24.8 |

TABLE 7-continued

| New test no. | | | | | | | | | | Raw material powder Ti, Zr, Hf number density $N_{G4}$ (100,000,000/g) | Ca, Sr, Ba number density $N_{AE}$ (100,000,000/g) | Primary coating $D_{Al}$ (μm) | ND (/μm²) | $RA_{area}$ (%) | Evaluation test Magnetism | Adhesion | Rust resistance | Remarks |
|---|---|---|---|---|---|---|---|---|---|---|---|---|---|---|---|---|---|---|
| 75 | B | 3.50 | 10.50 | 14.00 | 1.20 | 1.65 | 9.88 | 6.00 | 0.19 | 911.4 | | | | | | | | |
| 76 | B | 3.00 | 2.50 | 5.50 | 3.00 | 3.60 | 9.72 | 2.70 | 0.57 | 98.5 | | | | | | | | |
| 77 | B | 3.50 | 2.50 | 6.00 | 1.20 | 9.33 | 8.40 | 0.90 | 2.15 | 21.2 | | | | | | | | |
| 78 | B | 3.00 | 2.50 | 5.50 | 2.40 | 8.21 | 11.50 | 1.40 | 1.98 | 21.6 | | | | | | | | |
| 79 | B | 3.50 | 2.50 | 6.00 | 1.50 | 2.72 | 14.30 | 5.25 | 0.89 | 203.5 | | | | | | | | |
| 80 | B | 3.00 | 2.50 | 5.50 | 1.50 | 3.04 | 22.81 | 7.50 | 1.06 | 151.5 | | | | | | | | |
| 81 | B | 3.00 | 3.00 | 6.00 | 3.20 | 10.04 | 0.80 | 0.08 | 0.67 | 21.5 | | | | | | | | |
| 82 | B | 3.00 | 2.50 | 5.50 | 2.50 | 14.00 | 24.51 | 1.75 | 1.98 | 23.4 | | | | | | | | |
| 83 | A | 1.50 | 1.80 | 3.30 | 0.00 | 6.22 | — | — | 0.83 | 18.4 | | | | | | | | |
| 84 | A | 1.60 | 0.00 | 1.60 | 1.60 | 5.11 | 3.26 | 0.64 | — | 19.2 | | | | | | | | |
| 85 | B | 1.80 | 2.50 | 4.30 | 2.10 | 2.41 | 2.10 | 0.87 | 0.72 | 14.2 | | | | | | | | |
| 86 | B | 2.10 | 3.10 | 5.20 | 3.30 | 3.23 | 4.12 | 1.28 | 0.68 | 19.8 | | | | | | | | |
| 87 | A | 2.10 | 4.20 | 6.30 | 2.44 | 4.88 | 1.46 | 0.30 | 0.50 | 17.2 | | | | | | | | |
| 88 | B | 2.70 | 4.10 | 6.80 | 3.22 | 4.17 | 3.22 | 0.77 | 0.66 | 16.9 | | | | | | | | |
| 89 | A | 1.30 | 1.22 | 2.52 | 0.00 | 2.55 | — | — | 1.07 | 242.7 | | | | | | | | |
| 90 | A | 0.00 | 1.42 | 1.42 | 1.40 | — | 1.55 | — | — | — | | | | | | | | |
| 91 | B | 1.51 | 1.57 | 3.08 | 1.88 | 3.55 | 3.82 | 1.08 | 0.96 | 105.2 | | | | | | | | |
| 92 | B | 2.36 | 3.22 | 5.58 | 2.41 | 6.12 | 3.88 | 0.63 | 0.73 | 25.5 | | | | | | | | |
| 93 | A | 1.88 | 1.99 | 3.87 | 2.07 | 1.55 | 3.15 | 2.03 | 0.94 | 2013.1 | | | | | | | | |
| 94 | B | 3.55 | 5.07 | 8.62 | 3.22 | 2.11 | 4.25 | 2.01 | 0.70 | 508.4 | | | | | | | | |
| 95 | A | 1.20 | 0.00 | 1.20 | 0.82 | 2.66 | 5.42 | 2.04 | — | 305.4 | | | | | | | | |
| 96 | A | 0.00 | 1.43 | 1.43 | 1.55 | — | 3.15 | — | — | — | | | | | | | | |
| 97 | B | 2.15 | 2.80 | 4.95 | 3.22 | 2.44 | 7.12 | 2.92 | 0.77 | 299.1 | | | | | | | | |
| 98 | B | 3.00 | 3.50 | 6.50 | 3.80 | 3.98 | 6.44 | 1.62 | 0.86 | 139.6 | | | | | | | | |
| 99 | A | 4.11 | 4.00 | 8.11 | 3.55 | 1.42 | 3.88 | 2.73 | 1.03 | 1544.7 | | | | | | | | |
| 100 | B | 1.52 | 3.52 | 8.04 | 6.70 | 1.77 | 4.21 | 2.38 | 1.28 | 793.1 | | | | | | | | |
| 51 | | | | | | | | | | | 38.8 | 96.6 | 2.4 | 0.032 | 76 | 1.976 | 91 | Good | Inv. ex. |
| 52 | | | | | | | | | | | 72.1 | 63.2 | 2.4 | 0.036 | 85 | 1.951 | 92 | Good | Inv. ex. |
| 53 | | | | | | | | | | | 64.4 | 51.1 | 2.6 | 0.032 | 86 | 1.960 | 91 | Good | Inv. ex. |
| 54 | | | | | | | | | | | 62.2 | 96.6 | 2.5 | 0.037 | 87 | 1.952 | 91 | Good | Inv. ex. |
| 55 | | | | | | | | | | | 72.1 | 63.2 | 2.5 | 0.038 | 76 | 1.948 | 92 | Good | Inv. ex. |
| 56 | | | | | | | | | | | 49.8 | 96.6 | 3.8 | 0.032 | 72 | 1.970 | 94 | Fair | Comp. ex. |
| 57 | | | | | | | | | | | 35.4 | — | 2.1 | 0.033 | 74 | 1.946 | 91 | Fair | Comp. ex. |
| 58 | | | | | | | | | | | 72.1 | 63.2 | 2.2 | 0.034 | 73 | 1.946 | 92 | Fair | Comp. ex. |
| 59 | | | | | | | | | | | 72.1 | 922.1 | 4.0 | 0.032 | 76 | 1.942 | 97 | Good | Inv. ex. |
| 60 | | | | | | | | | | | 35.4 | 51.1 | 4.0 | 0.033 | 76 | 1.941 | 96 | Good | Inv. ex. |
| 61 | | | | | | | | | | | 72.1 | 62.1 | 4.0 | 0.033 | 72 | 1.938 | 99 | Fair | Comp. ex. |
| 62 | | | | | | | | | | | 72.1 | 42.1 | 4.0 | 0.031 | 71 | 1.944 | 97 | Fair | Comp. ex. |
| 63 | | | | | | | | | | | 35.4 | 63.2 | 4.0 | 0.038 | 70 | 1.924 | 96 | Fair | Comp. ex. |
| 64 | | | | | | | | | | | 35.4 | 160921.5 | 4.0 | 0.042 | 71 | 1.934 | 91 | Fair | Comp. ex. |
| 65 | | | | | | | | | | | 49.8 | 823462.4 | 4.1 | 0.038 | 71 | 1.930 | 95 | Fair | Comp. ex. |
| 66 | | | | | | | | | | | 49.8 | 623373.5 | 4.8 | 0.042 | 71 | 1.927 | 91 | Fair | Comp. ex. |
| 67 | | | | | | | | | | | 55.3 | 724493.2 | 4.2 | 0.035 | 68 | 1.924 | 92 | Fair | Comp. ex. |
| 68 | | | | | | | | | | | 72.1 | 694299.5 | 4.2 | 0.031 | 74 | 1.933 | 91 | Poor | Comp. ex. |
| 69 | | | | | | | | | | | 72.1 | 108.5 | 4.5 | 0.038 | 78 | 1.944 | 92 | Good | Inv. ex. |
| 70 | | | | | | | | | | | 49.8 | 301.4 | 4.2 | 0.048 | 79 | 1.921 | 93 | Good | Inv. ex. |
| 71 | | | | | | | | | | | 35.4 | 881762.4 | 4.8 | 0.042 | 71 | 1.921 | 93 | Fair | Comp. ex. |
| 72 | | | | | | | | | | | 72.1 | 531523.7 | 4.3 | 0.035 | 65 | 1.923 | 94 | Fair | Comp. ex. |
| 73 | | | | | | | | | | | 72.1 | 218862.0 | 3.9 | 0.031 | 71 | 1.934 | 92 | Fair | Comp. ex. |
| 74 | | | | | | | | | | | 72.1 | 5242.8 | 4.1 | 0.042 | 73 | 1.924 | 91 | Fair | Comp. ex. |
| 75 | | | | | | | | | | | 41.1 | 20.5 | 4.1 | 0.211 | 74 | 1.915 | 98 | Fair | Comp. ex. |
| 76 | | | | | | | | | | | 49.8 | 20.4 | 4.5 | 0.035 | 79 | 1.935 | 97 | Good | Inv. ex. |
| 77 | | | | | | | | | | | 72.1 | 43.5 | 3.8 | 0.031 | 76 | 1.922 | 91 | Good | Inv. ex. |
| 78 | | | | | | | | | | | 72.1 | 21.8 | 4.3 | 0.035 | 77 | 1.924 | 98 | Good | Inv. ex. |
| 79 | | | | | | | | | | | 55.4 | 62.4 | 3.5 | 0.031 | 74 | 1.922 | 91 | Fair | Comp. ex. |
| 80 | | | | | | | | | | | 41.2 | 20.4 | 3.8 | 0.042 | 71 | 1.921 | 91 | Fair | Comp. ex. |
| 81 | | | | | | | | | | | 42.5 | 17099.5 | 4.2 | 0.042 | 58 | 1.932 | 92 | Poor | Comp. ex. |
| 82 | | | | | | | | | | | 72.1 | 21.8 | 3.8 | 0.042 | 56 | 1.942 | 91 | Poor | Comp. ex. |
| 83 | | | | | | | | | | | 49.8 | — | 2.3 | 0.008 | 72 | 1.932 | 87 | Fair | Comp. ex. |
| 84 | | | | | | | | | | | — | 302.6 | 2.5 | 0.004 | 74 | 1.932 | 88 | Fair | Comp. ex. |
| 85 | | | | | | | | | | | 49.8 | 901.4 | 2.5 | 0.009 | 72 | 1.928 | 86 | Fair | Comp. ex. |
| 86 | | | | | | | | | | | 72.1 | 132.8 | 2.4 | 0.008 | 74 | 1.934 | 86 | Fair | Comp. ex. |
| 87 | | | | | | | | | | | 41.2 | 2755.6 | 2.6 | 0.009 | 72 | 1.922 | 87 | Fair | Comp. ex. |
| 88 | | | | | | | | | | | 72.1 | 259.5 | 2.4 | 0.007 | 72 | 1.928 | 84 | Fair | Comp. ex. |
| 89 | | | | | | | | | | | 18.2 | — | 1.2 | 0.032 | 71 | 1.923 | 86 | Fair | Comp. ex. |
| 90 | | | | | | | | | | | 17.5 | 4499.5 | 1.3 | 0.031 | 72 | 1.932 | 82 | Fair | Comp. ex. |
| 91 | | | | | | | | | | | 16.2 | 157.3 | 1.4 | 0.028 | 74 | 1.931 | 84 | Fair | Comp. ex. |
| 92 | | | | | | | | | | | 15.7 | 159.5 | 1.2 | 0.024 | 72 | 1.928 | 82 | Fair | Comp. ex. |
| 93 | | | | | | | | | | | 19.2 | 337.2 | 0.9 | 0.029 | 71 | 1.936 | 84 | Fair | Comp. ex. |
| 94 | | | | | | | | | | | 16.8 | 60.5 | 1.4 | 0.031 | 71 | 1.934 | 82 | Fair | Comp. ex. |

TABLE 7-continued

| | | | | | | | | | |
|---|---|---|---|---|---|---|---|---|---|
| 95 | — | 18.4 | 2.4 | 0.042 | 62 | 1.923 | 95 | Fair | Comp. ex. |
| 96 | 35.4 | 19.2 | 2.8 | 0.041 | 61 | 1.924 | 91 | Fair | Comp. ex. |
| 97 | 72.1 | 19.4 | 2.1 | 0.032 | 59 | 1.933 | 92 | Fair | Comp. ex. |
| 98 | 49.8 | 19.8 | 2.5 | 0.038 | 60 | 1.928 | 93 | Fair | Comp. ex. |
| 99 | 67.7 | 17.5 | 2.4 | 0.045 | 68 | 1.929 | 94 | Fair | Comp. ex. |
| 100 | 72.1 | 19.3 | 2.3 | 0.032 | 62 | 1.932 | 92 | Fair | Comp. ex. |

Number Density ND Measurement Test of Al Oxides

For each of the grain-oriented electrical steel sheets of the numbered tests, the Al oxide number density ND (/$\mu m^2$) at the Al peak position DAI was found by the following method. Glow discharge was performed using a glow discharge optical emission analysis apparatus down to the Al peak position $D_{Al}$. Any 52 μm×39 μm region (observed region) in the discharge marks at the Al peak position $D_{Al}$ was analyzed for elements using an energy dispersive type X-ray spectroscope (EDS). The Al oxides in the observed region were identified. The precipitates in the observed region containing Al and O were identified as Al oxides. The number of the identified Al oxides was counted, and the Al oxide number density ND (/$\mu m^2$) was found by the following formula:

ND=Number of identified Al oxides/area of observed region.

The Al oxide number density ND found is shown in Table 6 and Table 7.

Specific Al Oxide Area Ratio RAAREA Measurement Test

The identified Al oxide area ratio $RA_{AREA}$ was found by the following method. A glow discharge optical emission analysis apparatus was used for glow discharge down to the Al peak position $D_{Al}$. Any 30 μm×50 μm region (observed region) in the discharge marks at the Al peak position $D_{Al}$ was analyzed for elements by an energy dispersive type X-ray spectroscope (EDS) to identify the Al oxides in the observed region. Specifically, a region in which the intensity of the characteristic X-rays of O of 50% or more with respect to the maximum intensity of the characteristic X-rays of O in the observed region is analyzed was identified as an oxide. In the identified oxide regions, a region in which the intensity of the characteristic X-rays of Al of 30% or more with respect to the maximum intensity of the characteristic X-rays of Al is analyzed was identified as an Al oxide. Based on the measurement results, a distribution chart of Al oxides in the observed region was prepared.

In the prepared distribution chart (observed region), the areas of the Al oxides were calculated. Based on the results of calculation, in the distribution chart, Al oxides of an area of 0.4 to 10.0 μm$^2$ were deemed to be identified Al oxides. The total cross-sectional area of the identified Al oxides recognized was found. Furthermore, the total cross-sectional area of all Al oxides in the distribution chart was found and the identified Al oxide area ratio $RA_{AREA}$ Was found based on the following formula.

Identified Al oxide area ratio $RA_{AREA}$=total cross-sectional area of identified Al oxides in observed region/total cross-sectional area of all Al oxides in observed region×100

Measurement Test of Y, La, Ce, Ti, Zr, Hf, Ca, Sr, and Ba in Primary Coating

Each of the grain-oriented electrical steel sheets of the numbered tests was measured by the following method for the contents of Y, La, and Ce (mass %), the contents of Ti, Zr, and Hf (mass %), and the contents of Ca, Sr, and Ba (mass %) in the primary coating. Specifically, the grain-oriented electrical steel sheet was electrolyzed to separate the primary coating alone from the surface of the base metal steel sheet. The Mg in the separated primary coating was quantitatively analyzed by ICP-MS. The product of the obtained quantized value (mass %) and the molecular weight of $Mg_2SiO_4$ was divided by the atomic weight of Mg to find the content of $Mg_2SiO_4$ equivalent. The Y, La, Ce, Ti, Zr, Hf, Ca, Sr, and Ba in the primary coating were measured by the following method. The grain-oriented electrical steel sheet was electrolyzed to separate the primary coating alone from the surface of the base metal steel sheet. The contents of Y, La, and Ce (mass %), the contents of Ti, Zr, and Hf (mass %), and the contents of Ca, Sr, and Ba (mass %) in the separated primary coating were found by quantitative analysis by ICP-MS.

The contents of Y, La, and Ce (mass %), the contents of Ti, Zr, and Hf (mass %), and the contents of Ca. Sr, and Ba (mass %) obtained by measurement are shown in Table 6 and Table 7.

Magnetic Property Evaluation Test

Using the next method, the magnetic properties of each of the grain-oriented electrical steel sheets of the numbered tests were evaluated. Specifically, from each of the grain-oriented electrical steel sheets of the numbered tests, a sample of a rolling direction length of 300 mm×width 60 mm was taken. The sample was subjected to a magnetic field of 800A/m to find the magnetic flux density B8. Table 6 and Table 7 shows the test results. If the magnetic flux density B8 is 1.92T or more, it was judged that the magnetic properties were excellent.

Adhesion Evaluation Test

Using the next method, the adhesion of the primary coating of each of the grain-oriented electrical steel sheets of the numbered tests was evaluated. Specifically, a sample of a rolling direction length of 60 mm×width 15 mm was taken from each of the grain-oriented electrical steel sheets of the numbered tests. The sample was subjected to a flex test by a curvature of 10 mm. The flex test was performed using a bending resistance testing machine (made by TP Giken) while setting it at the sample so that the axial direction of the cylinder matched the width direction of the sample. The surface of the sample after the flex test was examined and the total area of the regions where the primary coating remained without being peeled off was found. The following formula was used to find the remaining rate of the primary coating. 35

Remaining rate of the primary coating=total area of regions in which primary coating remains without being peeled off/area of surface of sample×100.

Table 6 and Table 7 show the test results. If the remaining rate of the primary coating is 90% or more, it is judged that the adhesion of the primary coating with respect to the base steel sheet is excellent.

Rust Resistance Evaluation Test

The following method was used to evaluate the rust resistance of the coating of each of the grain-oriented electrical steel sheets of the numbered tests. Specifically, each of the grain-oriented electrical steel sheets of the numbered tests was coated with a predetermined insulating coating and held at a temperature of 80° C. and a wet (RH98%) atmosphere for 48 hours. The following formula was used to find the rate of formation of red rust.

Rate of formation of red rust=total area of region where red rust is confirmed/area of test piece Table 6 and Table 7 show the test results. The case where no red rust is formed was shown by "Good", a rate of formation of red rust of less than 5% was shown by "Fair", and a rate of formation of red rust of over 5% was shown by "Poor". If no red rust is formed (that is, if "Good" in Table 6 and Table 7), it was judged that the primary coating was excellent in rust resistance for the base metal steel sheet.

Test Results

Table 6 and Table 7 show the test results. Referring to Table 6 and Table 7, in Test Nos. 25 to 27, 35, 36, 40, 43, 44, 51 to 55, 59, 60, 69, 70, and 76 to 78, the chemical composition of the base metal steel sheet was suitable. Furthermore, the manufacturing conditions, in particular the additives in the annealing separator, were also suitable. For this reason, the Al peak position DAI was in the range of 2.4 to 12.0 μm and the Al oxide number density ND was in the range of 0.03 to 0.18/μm². Furthermore, the identified Al oxide area ratio $RA_{AREA}$ was 75.0% or more. Further, the content of Ce in the primary coating was in a range of 0.001 to 8.0%, the content of Zr was in a range of 0.0005 to 4.0%, and the content of Ca was in a range of 0.0005 to 4.0%.

Further, in particular in Test Nos. 26, 27, and 51 to 55, at least two types or more of compounds of metal selected from a group comprised of Ti, Zr, and Hf were contained, the primary coating exhibited extremely excellent adhesion, and extremely excellent magnetic properties were exhibited.

On the other hand, in Test Nos. 1, 2, and 6 to 8, the chemical composition was suitable, but the content $C_{R\,E}$ of Y, La, and Ce compounds converted to oxides in the annealing separator was too low. Furthermore, the content $C_{G\,4}$ of Ti, Zr, and Hf compounds converted to oxides in the annealing separator was too low and, furthermore, the content $C_{AE}$ of Ca, Sr, and Ba compounds converted to sulfates in the annealing separator was too low. For this reason, the Al peak position $D_{Al}$ or the Al oxide number density ND was too low. Further, the identified Al oxide area ratio $RA_{AREA}$ was less than 75.0%. As a result, the remaining rate of the primary coating was less than 90% and the adhesion as low. Further, the rust resistance was low.

On the other hand, in Test Nos. 3 to 5, 9 to 19, 21, 22, 33, 34, and 38, the chemical composition was suitable, but the content $C_{R\,E}$ of Y, La, and Ce compounds converted to oxides in the annealing separator was too low. As a result, in each of the grain-oriented electrical steel sheets of these numbered tests, for this reason, the identified Al oxide area ratio $RA_{AREA}$ became less than 75.0% and the rust resistance was low:

In Test Nos. 23, 24, 57, and 58, the chemical composition was suitable, but the content $C_{AE}$ converted to sulfates in the annealing separator was too low. For this reason, the identified Al oxide area ratio $RA_{AREA}$ became less than 75.0% and the rust resistance was low.

In Test Nos. 28, and 61, the chemical composition was suitable, but the content $C_{AE}$ converted to sulfates in the annealing separator was too high. For this reason, the identified Al oxide area ratio $RA_{AREA}$ became less than 75.0% and the rust resistance was low.

In Test Nos. 29, 62, 79, 80, and 82, the chemical composition was suitable, but the mean particle size $PS_{A\,E}$ of the Ca, Sr, and Ba compounds in the annealing separator was too high. For this reason, the identified Al oxide area ratio $RA_{AREA}$ became less than 75.0% and the rust resistance was low.

In Test Nos. 30, 56, and 63, the chemical composition was suitable, but the mean particle size ratio $RA_{AE/RE}$ in the annealing separator was too high. For this reason, the identified Al oxide area ratio $RA_{AREA}$ became less than 75.0% and the rust resistance was low.

In Test No. 31, the chemical composition was suitable, but the mean particle size ratio $RA_{AE/RE}$ in the annealing separator was too low. For this reason, $RA_{AREA}$ was too low. As a result, the remaining rate of the primary coating became less than 75% and the rust resistance was low.

In Test Nos. 20, 32, 37, 42, and 48, the chemical composition was suitable, but the content $C_{G\,4}$ of Ti, Zr, and Hf compounds converted to oxides in the annealing separator was too low. For this reason, the Al peak position $D_{Al}$ or the Al oxide number density ND was too low. As a result, the remaining rate of the primary coating became less than 90% and the adhesion as low.

In Test Nos. 39, 47, and 75, the chemical composition was suitable, but the content $C_{G4}$ of Ti, Zr, and Hf compounds converted to oxides in the annealing separator was too high. For this reason, the magnetic properties were degraded. Furthermore, the identified Al oxide area ratio $RA_{AREA}$ became less than 75.0% and the rust resistance was low.

In Test No. 41, the chemical composition was suitable, but the ratio of the sum of the number of Y, La, and Ce atoms to the sum of the numbers of Ti, Zr, and Hf atoms contained in the annealing separator was too high. The Al oxide number density ND was too low. As a result, the remaining rate of the primary coating became less than 90% and the adhesion as low.

In Test No. 45, the chemical composition was suitable, but total content of the content $C_{R\,E}$ of Y, La, and Ce compounds converted to oxides and the content $C_{4\,G}$ converted to oxides in the annealing separator was too high. For this reason, the identified Al oxide area ratio $RA_{AREA}$ became less than 75.0% and the rust resistance was low.

In Test No. 46, the chemical composition was suitable, but the content $C_{R\,E}$ of Y, La, and Ce compounds converted to oxides in the annealing separator was too high. For this reason, the magnetic flux density B8 became less than 1.92T and the magnetic properties were low.

In Test No. 49, the chemical composition was suitable, but the ratio of the sum of the number of Y, La, and Ce atoms to the sum of the numbers of Ti, Zr, and Hf atoms contained in the annealing separator was too low. For this reason, the identified Al oxide area ratio $RA_{AREA}$ became less than 75.0% and the rust resistance was low.

In Test No. 50, the chemical composition was suitable, but the total content of the content $C_{R\,E}$ converted to oxides and the content $C_{G\,4}$ converted to oxides in the annealing separator was too low. For this reason, the Al peak position DAI and the Al oxide number density ND were too low. As a result, the remaining rate of the primary coating became less than 90% and the adhesion as low.

In Test Nos. 64 to 68, 71 to 74, and 81, the chemical composition was suitable, but the mean particle size ratio $RA_{AE/RE}$ in the annealing separator was too low. For this reason, $RA_{AREA}$ was too low. As a result, the remaining rate of the primary coating became less than 75% and the rust resistance was low.

In Test Nos. 83 to 88, the number density of the particles in the raw material powder of the Y, La, and Ce compounds was too small. For this reason, the Al oxide number density ND was too low and the identified Al oxide area ratio $RA_{AREA}$ was less than 75.0%. As a result, the remaining rate of the primary coating became less than 90%, the adhesion was low, and the rust resistance was low.

In Test Nos. 89 to 94, the number density of the particles in the raw material powder of the Ti, Zr, and Hf compounds was too small. For this reason, the Al peak position DAl was too low and the identified Al oxide area ratio $RA_{AREA}$ was less than 75.0%. As a result, the remaining rate of the primary coating became less than 90%, the adhesion was low, and the rust resistance was low.

In Test Nos. 95 to 100, the number density of the particles in the raw material powder of the Ca, Sr, and Ba compounds was too small. For this reason, the identified Al oxide area ratio $RA_{AREA}$ was less than 75.0%. As a result, the remaining rate of the primary coating was 90% or more, but the rust resistance was low.

Above, embodiments of the present invention were explained. However, the embodiments explained above are only illustrations for working the present invention. Therefore, the present invention is not limited to the embodiments explained above and can be worked while suitably changing the embodiments explained above within a scope not deviating from its gist.

The invention claimed is:

1. A grain-oriented electrical steel sheet comprising
a base metal steel sheet having a chemical composition containing, by mass %,
C: 0.005% or less,
Si: 2.5 to 4.5%,
Mn: 0.02 to 0.2%,
one or more elements selected from the group comprised of S and Se: total of 0.005% or less,
sol. Al: 0.01% or less, and
N: 0.01% or less and
having a balance comprised of Fe and impurities and
a primary coating formed on a surface of the base metal steel sheet and containing $Mg_2SiO_4$ as a main constituent, where
a peak position of Al emission intensity obtained when performing elemental analysis by glow discharge optical emission spectrometry from a surface of the primary coating in a thickness direction of the grain-oriented electrical steel sheet is arranged within a range of 2.4 to 12.0 μm from the surface of the primary coating in the thickness direction,
a number density of Al oxides at the peak position of Al emission intensity and of a size of 0.2 μm or more in terms of a circle equivalent diameter based on the area is 0.03 to 0.18/μm², and,
in a plurality of Al oxides in an observed region of 30 μm×50 μm at the peak position of Al emission intensity, a total cross-sectional area of identified Al oxides with cross-sectional areas of 0.4 to 10.0 μm² is 75.0% or more of the total cross-sectional area of all Al oxides in the observed region.

2. A method for manufacturing the grain-oriented electrical steel sheet according to claim 1, the method comprising,
a process for cold rolling hot rolled steel sheet containing by mass %,
C: 0.1% or less,
Si: 2.5 to 4.5%,
Mn: 0.02 to 0.2%,
one or more elements selected from the group comprised of S and Se: total of 0.005 to 0.07%,
sol. Al: 0.005 to 0.05%, and
N: 0.001 to 0.030% and
having a balance comprised of Fe and impurities by a cold rolling rate of 80% or more to manufacture cold rolled steel sheet,
a process for decarburization annealing the cold rolled steel sheet,
a process for coating the surface of the cold rolled steel sheet after decarburization annealing with an aqueous slurry containing an annealing separator and drying the aqueous slurry on the surface of the cold rolled steel sheet in a 400 to 1000° C. furnace, and
a process for performing finish annealing on the cold rolled steel sheet after the aqueous slurry has been dried, where
the annealing separator contains
MgO,
at least one or more types of compounds selected from a group comprised of Y, La, and Ce,
at least one or more types of compounds of metal selected from a group comprised of Ti, Zr, and Hf, and
at least one or more types of compounds of metal selected from a group comprised of Ca, Sr, and Ba,
when a content of the MgO in the annealing separator is defined as 100% by mass %, a total content of the compounds selected from a group comprised of Y, La, and Ce converted to oxides is 0.8 to 8.0%, a total content of the compounds of metal selected from a group comprised of Ti, Zr, and Hf converted to oxides is 0.5 to 9.0%, and a total content of the compounds of metal selected from a group comprised of Ca, Sr, and Ba converted to sulfates is 0.5 to 8.0%,
a mean particle size of the compounds of metal selected from a group comprised of Ca, Sr, and Ba is 12 μm or less,
a ratio of the mean particle size of the compounds of metal selected from a group comprised of Ca, Sr, and Ba to the mean particle size of the compounds of metal selected from a group comprised of Y, La, and Ce is 0.1 to 3.0,
a total of the total content of the compounds of metal selected from a group comprised of Y, La, and Ce converted to oxides and the total content of the compounds of metal selected from a group comprised of Ti, Zr, and Hf converted to oxides is 2.0 to 12.5%,
a ratio of a sum of the numbers of Y, La, and Ce atoms to a sum of the numbers of Ti, Zr, and Hf atoms contained in the annealing separator is 0.18 to 4.0,
still further a number density of particles of the compounds of metal selected from the group comprised of Y, La, and Ce which are particles of a spherical equivalent diameter based on volume of 0.1 μm or more is 2,000,000,000/g or more,
still further a number density of particles of the compounds of metal selected from the group comprised of Ti, Zr, and Hf which are particles of a spherical equivalent diameter based on volume of 0.1 μm or more is 2,000,000,000/g or more, and
still further a number density of particles of the compounds of metal selected from the group comprised of Ca, Sr, and Ba which are particles of a spherical equivalent diameter based on volume of 0.1 μm or more is 2,000,000,000/g or more.

3. The method for manufacturing grain-oriented electrical steel sheet according to claim 2, in which method for manufacturing grain-oriented electrical steel sheet,
the chemical composition of the hot rolled steel sheet further contains, in place of part of the Fe, one or more elements selected from a group comprised of Cu, Sb and Sn in a total of 0.6% or less.

4. The method for manufacturing grain-oriented electrical steel sheet according to claim 2, in which method for manufacturing grain-oriented electrical steel sheet,
the chemical composition of the hot rolled steel sheet further contains, in place of part of the Fe, one or more elements selected from a group comprised of Bi, Te, and Pb in a total of 0.03% or less.

* * * * *